(12) United States Patent
Leger et al.

(10) Patent No.: US 7,027,898 B1
(45) Date of Patent: Apr. 11, 2006

(54) WEATHER INFORMATION NETWORK INCLUDING GRAPHICAL DISPLAY

(75) Inventors: Daniel R. Leger, Phoenix, AZ (US); David Burdon, Phoenix, AZ (US); Robert S. Son, Phoenix, AZ (US); Kevin D. Martin, Phoenix, AZ (US); John Harrison, Phoenix, AZ (US); Keith R. Hughes, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 802 days.

(21) Appl. No.: 09/698,278

(22) Filed: Oct. 30, 2000

(51) Int. Cl.
*G08B 23/00* (2006.01)
*G01S 13/00* (2006.01)

(52) U.S. Cl. .................. 701/14; 701/200; 342/26

(58) Field of Classification Search .................. 701/14, 701/200, 120, 122; 702/3; 342/26, 351, 342/58, 60, 61, 63, 36; 340/945, 963, 825.72, 340/949, 968, 962; 455/431, 67.1
See application file for complete search history.

(56) References Cited

U.S. PATENT DOCUMENTS

| | | | |
|---|---|---|---|
| 3,781,530 A | 12/1973 | Britland et al. ........ 235/150.26 |
| 4,295,139 A | 10/1981 | Arpino .................. 340/870.01 |
| 4,318,076 A | 3/1982 | Whitfield ..................... 340/27 |
| 4,521,857 A | 6/1985 | Reynolds, III .............. 364/439 |
| 4,642,775 A * | 2/1987 | Cline et al. ................. 364/443 |
| 4,706,198 A * | 11/1987 | Thurman .................... 364/439 |
| 5,023,934 A | 6/1991 | Wheeless ..................... 455/45 |
| 5,257,021 A | 10/1993 | Cornman .................... 340/968 |
| 5,265,024 A * | 11/1993 | Crabill et al. .............. 364/443 |
| 5,351,045 A | 9/1994 | Cornman .................... 340/968 |
| 5,363,107 A | 11/1994 | Gertz et al. ................... 342/26 |
| 5,434,565 A | 7/1995 | Simon et al. ............... 340/949 |
| 5,463,656 A | 10/1995 | Polivka et al. ............. 375/200 |
| 5,614,907 A | 3/1997 | Kreitmair-Steck et al. .... 342/25 |
| 5,657,009 A | 8/1997 | Gordon ...................... 340/968 |
| 5,714,948 A | 2/1998 | Farmakis et al. ........... 340/961 |
| 5,757,322 A * | 5/1998 | Ray et al. ................... 342/460 |
| 5,781,195 A * | 7/1998 | Marvin ....................... 345/428 |
| 5,793,813 A | 8/1998 | Cleave ....................... 375/259 |

(Continued)

OTHER PUBLICATIONS

AOPA Pilot, "Garmin's 430,530 moving maps learn new trick," Feb. 2000 Issue, p. 32.

(Continued)

*Primary Examiner*—Thomas G. Black
*Assistant Examiner*—Dalena Tran
(74) *Attorney, Agent, or Firm*—Andrew A. Abeyta

(57) ABSTRACT

An apparatus for providing weather information onboard an aircraft includes a processor unit and a graphical user interface. The processor unit processes weather information after it is received onboard the aircraft from a ground-based source, and the graphical user interface provides a graphical presentation of the weather information to a user onboard the aircraft. Preferably, the graphical user interface includes one or more user-selectable options for graphically displaying at least one of convection information, turbulence information, icing information, weather satellite information, SIGMET information, significant weather prognosis information, and winds aloft information.

8 Claims, 38 Drawing Sheets

U.S. PATENT DOCUMENTS

| | | | |
|---|---|---|---|
| 6,240,369 B1 * | 5/2001 | Foust | 702/3 |
| 6,313,759 B1 * | 11/2001 | Musland-Sipper | 340/945 |
| 5,890,079 A | 3/1999 | Levine | 701/14 |
| 5,999,882 A * | 12/1999 | Simpson et al. | 702/3 |
| 6,014,606 A * | 1/2000 | Tu | 701/200 |
| 6,043,756 A * | 3/2000 | Bateman et al. | 340/945 |
| 6,076,044 A | 6/2000 | Brown | 702/3 |
| 6,173,159 B1 * | 1/2001 | Wright et al. | 455/66 |
| 6,184,816 B1 * | 2/2001 | Zheng et al. | 342/26 |

OTHER PUBLICATIONS

The AWIN Implementation Team, Phase I Final Report Summary, Non-Proprietary Version (Aug. 31, 2000).

C.H. Scanlon, "A Graphical Weather System Design for the NASA Transport Systems Research Vehicle B-737", NASA Technical Memorandum (104205), pp. 1-18 (Feb. 1992).

US 5,867,805, 02/1999, Brown (withdrawn)

* cited by examiner

WEATHER INFORMATION NETWORK INCLUDING GRAPHICAL DISPLAY

GOVERNMENT RIGHTS

This invention was made under Contract No. NCC-1-288, awarded by NASA. The government has certain rights in the invention.

BACKGROUND OF THE INVENTION

1. Field of the Invention

The present invention relates generally to a weather information network, and, more particularly, to a method of and a system for providing graphical weather information to an aircraft.

2. Description of the Related Art

Conventionally, to acquire real-time graphical information about oncoming weather while en route, aircraft pilots had to rely upon onboard weather radar systems. The usefulness of such radar systems, however, is limited. Even the most advanced radar systems can only provide a glimpse of weather within a few hundred mile radius of the aircraft. In addition, heavy rain sometimes can overcome the aircraft's radar so that it is unable to penetrate clouds and detect weather conditions on the other side of the clouds. This phenomenon, known as precipitation attenuation, has been identified as a contributing factor in many weather-related accidents. Finally, pilots require a myriad of weather information that onboard weather radar systems do not provide. For this information, pilots must rely upon voice communications with ground personnel or textual communications through the Aircraft Communications Addressing and Reporting System, better known as ACARS. Both of these communication routes, however, rely upon a dispatcher on the ground to relay timely and accurate information to the aircraft. During peak times, there can be a substantial lag between the time a request for information is made and the time that information is sent to the aircraft. Additionally, information obtained in this manner is either oral or textual and, therefore, requires the pilot to visualize the location and scope of potential weather hazards. This can be a difficult and stressful task, especially when trying to navigate an aircraft in inclement weather.

U.S. Pat. No. 6,014,606 discloses a system for automatically transmitting weather information from a ground station to an aircraft via satellite broadcast. Once the weather information is received onboard the aircraft, it is processed and displayed to the pilot on a cockpit display screen. According to the '606 patent, the types of weather information that are broadcast to the aircraft can include radar mosaic images, lightning images, and surface observations for various airports including temperature, visibility, ceiling, precipitation, dew point, and the like.

One shortcoming of the system disclosed in the '606 patent is that it leaves pilots to surmise, based on information that is suggestive at best, as to the existence, location, and severity of some of the weather hazards with which they are most concerned, such as convection, turbulence, and icing. For example, even with the system disclosed in the '606 patent, a pilot would have to speculate as to the location and severity of convective activity based on textual reports, oral advisories, and images of radar and lightning. None of these types of information, however, provides a complete and accurate picture of the location and severity of convective activity. Instead, the pilot must assimilate all of this information and make a judgment call. This scenario is even more difficult for turbulence and icing hazards, as radar mosaics and lightning images do not provide any indication of these hazards. Further, what relevant information that is available requires the pilot to make a judgment based on oral and textual messages and other indirect indicators. This is a time consuming and mentally exhausting exercise that can distract the pilot from the task at hand—flying the aircraft. Moreover, errors in judgment can potentially endanger the passengers and crew, not to mention waste time and fuel spent back-tracking or on misguided detours.

Another significant drawback of the system described in the '606 patent is its failure to provide for two-way communication between the onboard user interface and the ground station. Broadcasts are inherently unreliable, so if only a portion of a broadcast is received, or perhaps none of it at all, the pilot is unable to request retransmission of the broadcast from the ground station. Instead, the pilot must wait for the next broadcast, which, depending on the proximity and severity of adverse weather ahead, could be too late. Additionally, the foregoing system does not permit pilots to request information that may not normally be broadcast in the region in which they are flying, nor does it allow pilots to limit what types of information are transmitted to the aircraft, or how frequently such information is updated, based on their individual preferences.

Accordingly, there is a need in the art for an improved weather information network that addresses the shortcomings of conventional systems and methods such as noted above.

SUMMARY OF THE INVENTION

The present invention addresses the foregoing shortcomings in the art by providing a method of and system for providing pilots with the information and tools they need to make more informed and intelligent decisions when approaching adverse weather. Such method and apparatus enhances the pilot's situational awareness by displaying near real-time weather information for regions all over the world, thus improving flight economy and safety and increasing the likelihood of an on-time arrival.

In one aspect, the present invention relates to an apparatus for providing weather information onboard an aircraft. The apparatus includes a processor unit that processes weather information after it is received onboard the aircraft from a ground-based source and a graphical user interface that provides a graphical presentation of the weather information to a user onboard the aircraft. By "graphical presentation" it is meant that at least some types of weather information are illustrated pictorially rather than merely in text form. An example of a graphical display of weather information is an image or pattern superimposed on a map of a geographic region, wherein the image or pattern indicates the location or characteristics of a particular weather phenomenon, such as convection, turbulence, icing, cloud cover, precipitation, etc. Another example would be a cross-sectional display of weather information taken along a route of the aircraft. The graphical user interface also includes one or more user-selectable options for graphically displaying at least one of convection information, turbulence information, icing information, weather satellite information, SIGMET information, significant weather prognosis information, and winds aloft information. Preferably, the graphical user interface further includes a user-selectable option that allows the user to request specific weather information for transmission from the ground-based source to the aircraft. Advantageously, this option, or another option, allows the user to select what weather information is automatically transmitted from the ground-based source.

In another aspect, the present invention relates to an apparatus for providing weather information onboard an aircraft that includes at least a processor unit and a graphical user interface. The processor unit processes weather information after it is received onboard the aircraft from a ground-based source. The graphical user interface provides a plan view of the weather information and position of the aircraft to a user onboard the aircraft, and includes a user-selectable option for centering the plan view on the position of the aircraft, even as the position of the aircraft changes. Optionally, the graphical user interface further includes a user-selectable option for orienting the plan view so that the aircraft track points upward.

In still another aspect, the present invention relates to an apparatus for providing weather information onboard an aircraft that includes a processor unit and a graphical user interface. The processor unit processes weather information, including three-dimensional weather information, after it is received onboard the aircraft from a ground-based source. By "three-dimensional weather information" it is meant that the weather information is specific to latitude, longitude, and altitude. The graphical user interface provides a plan view of the weather information for a selected altitude to a user onboard the aircraft, and which includes a user-selectable option for changing the selected altitude.

In yet another aspect, the present invention relates to a method of providing convection information to an aircraft. Namely, the method includes the steps of collecting convection information at a data center, transmitting the convection information from the data center to an aircraft, and graphically displaying the convection information onboard the aircraft. Preferably, the convection information includes both convective activity observations and forecasts.

In a further aspect, the present invention relates to a method of providing turbulence information to an aircraft. The method includes the steps of collecting turbulence information at a data center, transmitting the turbulence information from the data center to an aircraft, and graphically displaying the turbulence information onboard the aircraft. Preferably, the turbulence information includes both turbulence observations and forecasts.

In another aspect, the present invention relates to a method of providing icing information to an aircraft. The method includes the steps of collecting icing information at a data center, transmitting the icing information from the data center to an aircraft, and graphically displaying the icing information onboard the aircraft. Preferably, the icing information includes both icing observations and forecasts.

In a still further aspect, the present invention relates to a method of providing weather satellite information to an aircraft. The method includes the steps of collecting weather satellite information at a data center, transmitting the weather satellite information from the data center to an aircraft, and graphically displaying the weather satellite information onboard the aircraft. Preferably, the weather satellite information is altitude based.

In another aspect, the present invention relates to a method of providing SIGMET information to an aircraft, including the steps of collecting SIGMET information at a data center, transmitting the SIGMET information from the data center to an aircraft, and graphically displaying the SIGMET information onboard the aircraft.

In yet another aspect, the present invention relates to a method of providing significant weather prognosis information to an aircraft. Namely, the method includes the steps of collecting significant weather prognosis information at a data center, transmitting the significant weather prognosis information from the data center to an aircraft, and graphically displaying the significant weather prognosis information onboard the aircraft.

In a further aspect, the present invention relates to a method of providing winds aloft information to an aircraft, including the steps of collecting winds aloft information at a data center, transmitting the winds aloft information from the data center to an aircraft, and graphically displaying the winds aloft information onboard the aircraft. Preferably, the winds aloft information includes both winds aloft observations and forecasts.

A better understanding of these and other aspects, features, and advantages of the present invention may be had by reference to the drawings and to the accompanying description, in which there are illustrated and described some preferred embodiments of the invention.

BRIEF DESCRIPTION OF THE DRAWINGS

Throughout the figures, like reference numerals have been used for like or corresponding parts.

DESCRIPTION OF THE PREFERRED EMBODIMENTS

The present invention is directed to an entire weather information network, including the collection and processing of weather information at a data center, the communication of that information to an aircraft, and the display of such information to a user onboard the aircraft.

1. The Data Center

Figure 1:
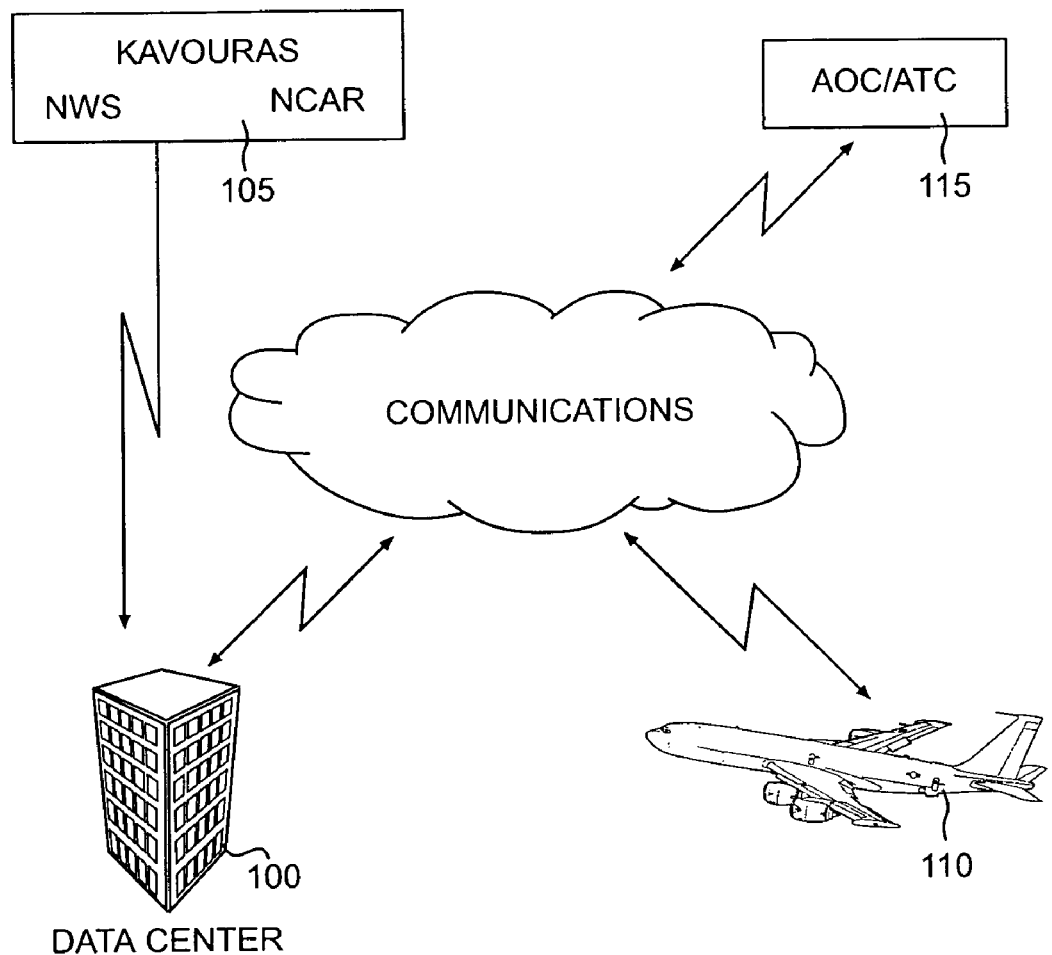
FIG. 1 is a schematic illustration of a weather information network according to the present invention.

As depicted in FIG. 1, the data center 100 collects weather information from a variety of weather sources 105. The weather information then is compiled, packaged, and queued for further transmission to an aircraft 10 via one of several possible communication routes, such as shown in FIGS. 2–6.

The weather sources 105 may include commercial providers such as, for example, Kavouras, the National Center for Atmospheric Research (NCAR), the National Weather Service (NWS), Weather Service Information (WSI), and the like. Weather information may also come from other sources, such as the Federal Aviation Administration (FAA), Airline Operations Communication (AOC), or even aircrafts themselves.

Preferably, the data center collects weather information relating to a plurality of data sets or weather components, such as, for example, the following:

(1) Convective activity observations and forecasts: This data set, available from NCAR, includes observations and forecasts of convective hazards and their severity.

(2) Turbulence observations and forecasts: This data set, available from NCAR, includes observations and forecasts of the location and severity of non-convective turbulence, also know as clear air turbulence. Preferably, this is a three-dimensional set including altitude-specific turbulence data.

(3) Icing observations and forecasts: This data set, available from NCAR, includes observations and forecasts of airborne icing hazards and their severity. Preferably, this is a three-dimensional set including altitude-specific icing data.

(4) Altitude-based weather satellite information: This three-dimensional data set, available from Kavouras, consists of satellite images depicting cloud cover.

(5) SIGMETs and convective SIGMETs: SIGMETs, short for significant meteorological information, are manually-generated warnings of adverse meteorological conditions that could affect an aircraft. Convective SIGMETs, also called WSTs, are issued for tornadoes, severe thunderstorms, large hail, and strong wind gusts. SIGMET and WST information are available from NWS. Herein, the term SIGMET encompasses both SIGMETs and WSTs.

(6) High-level significant weather prognosis: This is a forecast of hazards to high-altitude aircrafts, including thunderstorms and cumulonimbus clouds, tropical cyclones, severe squall lines, moderate or severe turbulence, moderate or severe icing, widespread sand storms and dust storms, well-defined surface convergence zones, surface fronts with speed and direction of movement, tropopause heights, jet streams, and volcanic eruptions. This forecast is available from NWS.

(7) Winds aloft: This three-dimensional data set, available from NWS, consists of wind direction and velocity observations and forecasts for various altitudes.

(8) Weather radar mosaic: This data set, available from Kavouras, includes a mosaic of all precipitation, whether liquid, solid, or mixed, that is detected by weather radar within a coverage area.

(9) METARs and SPECIs: METARs are hourly surface weather observations from airports around the world, including information regarding temperature, dewpoint, wind speed and direction, gusts, ceiling, visibility, runway visual range, pressure, severe weather notifications, and other comments. A METAR for a particular airport is identified by a unique four-letter code, assigned by the International Civil Aviation Organization (ICAO). SPECIs provide essentially the same information as METARs, but instead of being issued hourly, they are issued only when dictated by changing weather conditions. METAR and SPECI information is available through NWS. Herein, the term METAR encompasses both METARs and SPECIs.

(10) TAFs: TAFs are concise forecasts of expected meteorological conditions at airports around the world during a specified period, usually 24 hours. TAF information is available through NWS.

(11) Surface analysis: This data set, available from NWS, indicates current surface conditions, including areas of high and low pressure centers, ridges and troughs, and lines of constant pressure (i.e., isobars).

(12) NOTAMs: NOTAMs, short for notices to airmen, are FAA-generated notices concerning miscellaneous factors that affect aircrafts.

(13) EPIREPs: EPIREPs, short for electronic pilot reports, are aircraft-generated reports regarding actual pilot observations. In accordance with the present invention, EPIREPs can be sent first from the originating aircraft to the data center before being forwarded to other aircrafts, or they can be sent directly from one aircraft to another.

Currently only some of the foregoing components, such as weather satellite information, METARs, TAFs, and SIGMETs, provide worldwide coverage. The rest are limited to smaller geographic regions, such as the continental United States, the Pacific, the Atlantic, the Caribbean, and Europe. As weather information technology develops, it is expected that most, if not all, of the data sets will soon provide worldwide coverage.

The weather sources 105 collect the information in near real-time and immediately relay that information to the data center 100, either in text format or as a two- or three-dimensional grid, depending on the particular data set. Weather information may be relayed to the data center 100 by any suitable route, such as via satellite broadcast or FTP push. Current conditions, such as convective activity and turbulence, preferably are updated at least once every five minutes. Forecast information, on the other hand, may be updated less frequently, such as on an hourly basis.

Once received at the data center 100, the weather information is automatically filtered and deposited onto a main server (not shown). From there, the information is pulled over to a processor (not shown), where it is decompressed, reformatted, recompressed, and prioritized, before being sent back to the main server. The processed information then is queued for further transmission to an aircraft 110. Preferably, all incoming weather information is archived on an optical drive (not shown), together with any algorithms employed by the processor. That way the data center 100 is able to reconstruct any historical incoming or outgoing weather data if the need arises.

It will be appreciated that the same information that is made available to aircrafts may also be made available to airline dispatchers and meteorologists, as well as air traffic controllers 115.

2. Communication Routes

The application contemplates several different routes for communicating the weather information from the data center 100 to the aircraft 110. Included among these are both point-to-point solutions such as telephony, as well as point-to-multipoint solutions such as satellite or VHF broadcast. A few preferred communication solutions are described below with reference to FIGS. 2–5.

In one preferred embodiment, for example, the weather information is transmitted to the aircraft 110 via a telephone connection, known as telephony. In this embodiment, the aircraft 110 initiates a call to the data center 100 to request new or updated weather information. The call may be initiated manually by a user onboard the aircraft 110, or it may be initiated automatically at specified intervals. The data center 100 matches the aircraft's request to the queued information and transmits the requested information to the aircraft 110 via either a VHF/UHF or satellite-implemented communication link.

Figure 2:
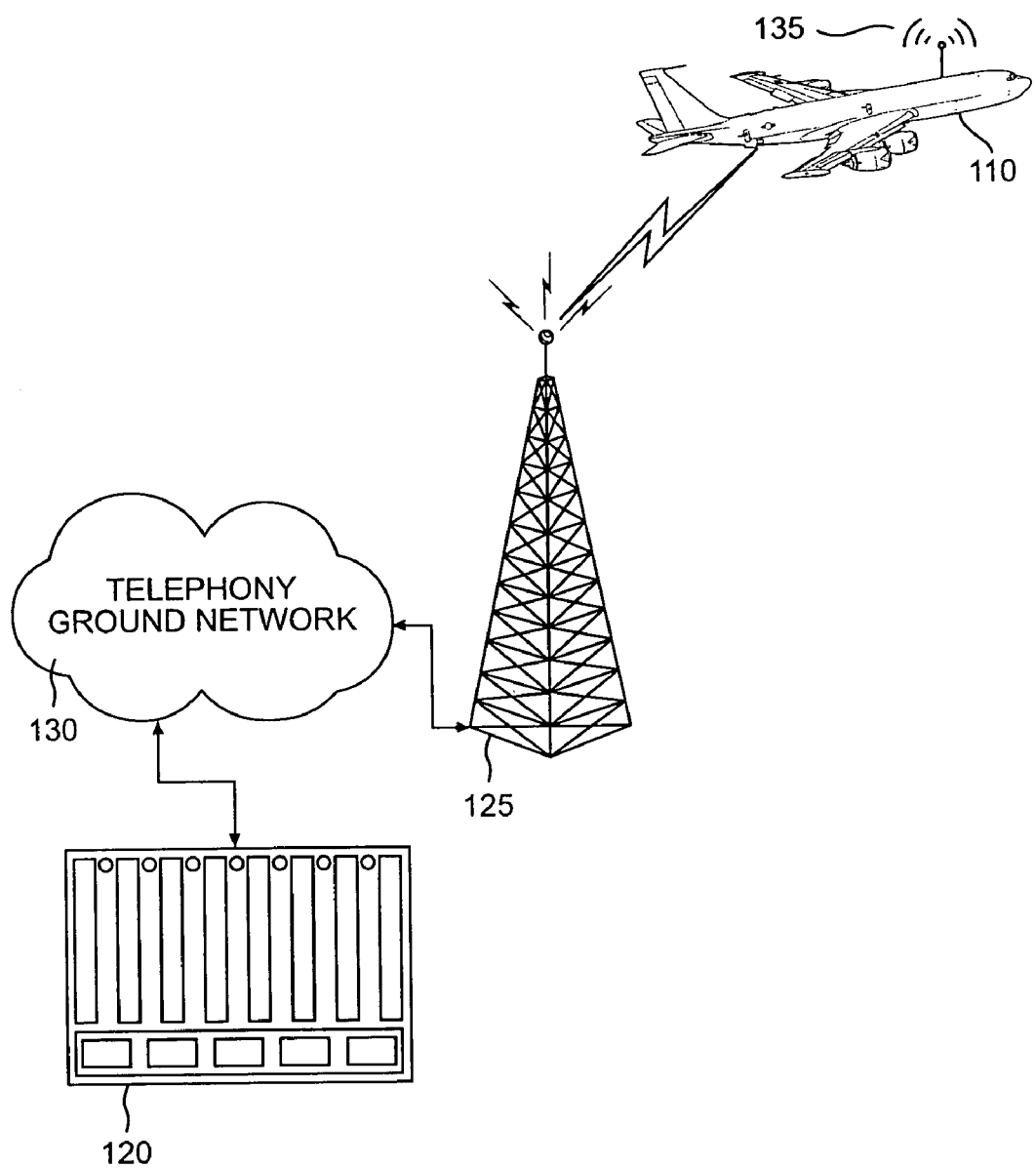
FIG. 2 is a schematic illustration of a VHF/UHF-implemented telephony communication route according to a preferred embodiment of the present invention.

FIG. 2 schematically depicts a preferred example of the VHF/UHF-implemented telephony communication link. As shown, a modem bank 120 at the data center 100 is connected to a network of terrestrial VHF/UHF transceivers 125, such as one or more radio towers, via a telephony ground network 130. The ground-based VHF/UHF transceivers 125 communicate with the aircraft through a transceiver 135 onboard the aircraft, discussed below in more detail with reference to FIGS. 7 and 8. This communication route is especially desirable to customers insofar as it utilizes existing communication equipment. Therefore, implementation costs are minimal.

Figure 3:
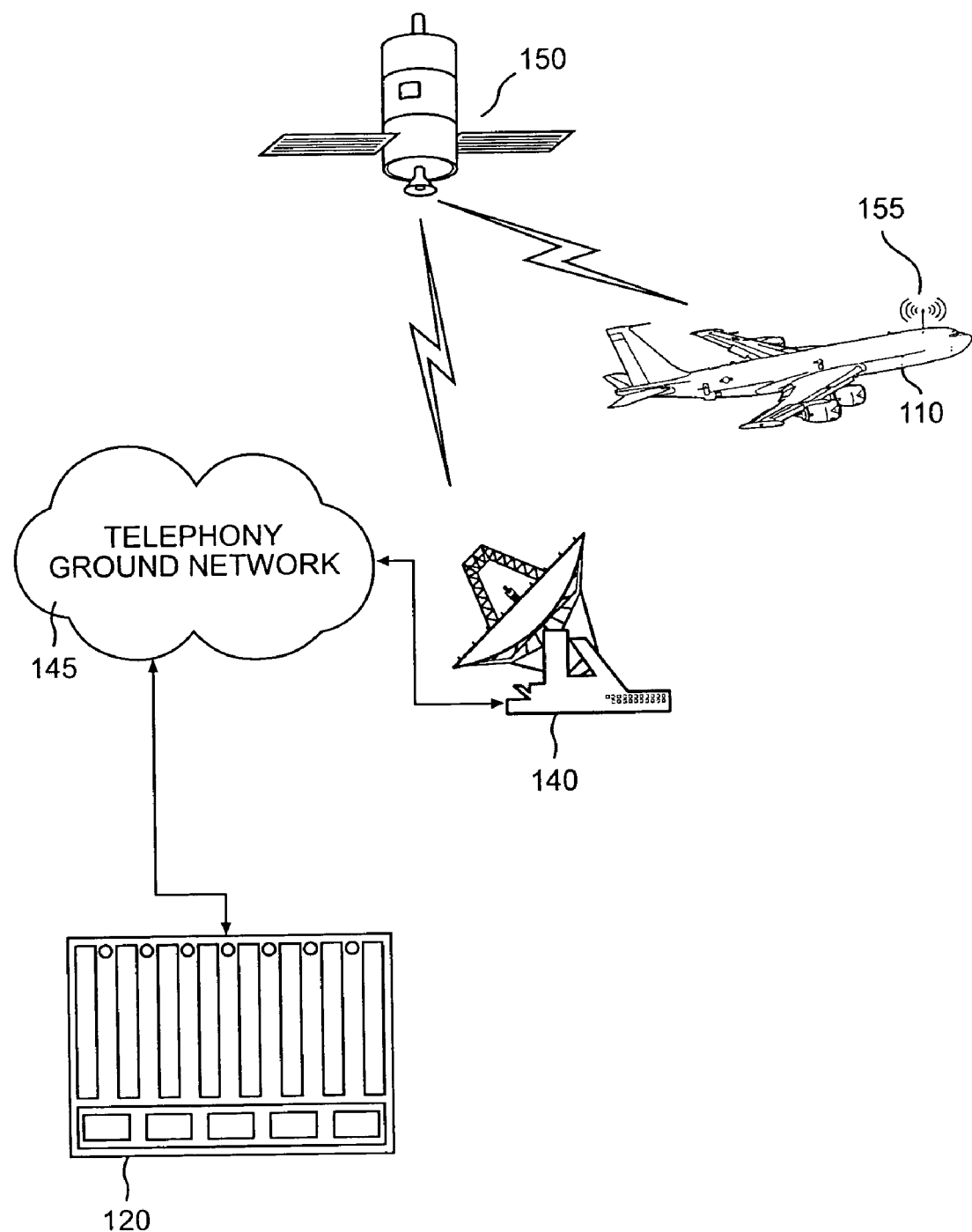
FIG. 3 is a schematic illustration of a satellite-implemented telephony communication route according to another preferred embodiment of the present invention.

FIG. 3 schematically depicts a preferred example of the satellite-implemented telephony communication link. In this example, the data center modem bank 120 is connected to a satellite ground station 140 via a telephony ground network 145. The satellite ground station 140 transmits the weather information to one or more airborne satellites 150, which in turn transmit the information to a transceiver 155 onboard the aircraft 120. One advantage to this communication route is that it provides coverage over oceans and VHF/UHF unequipped land masses, such as South America.

Instead of telephony, in another preferred embodiment, the weather information is transmitted to the aircraft 110 via VHF or satellite broadcast. In this embodiment, the data center 100 pushes the weather information to a broadcast provider, which in turn broadcasts the information throughout a region in which the aircraft 110 is flying. Examples VHF and satellite broadcast options are illustrated in FIGS. 4–6.

Figure 4:
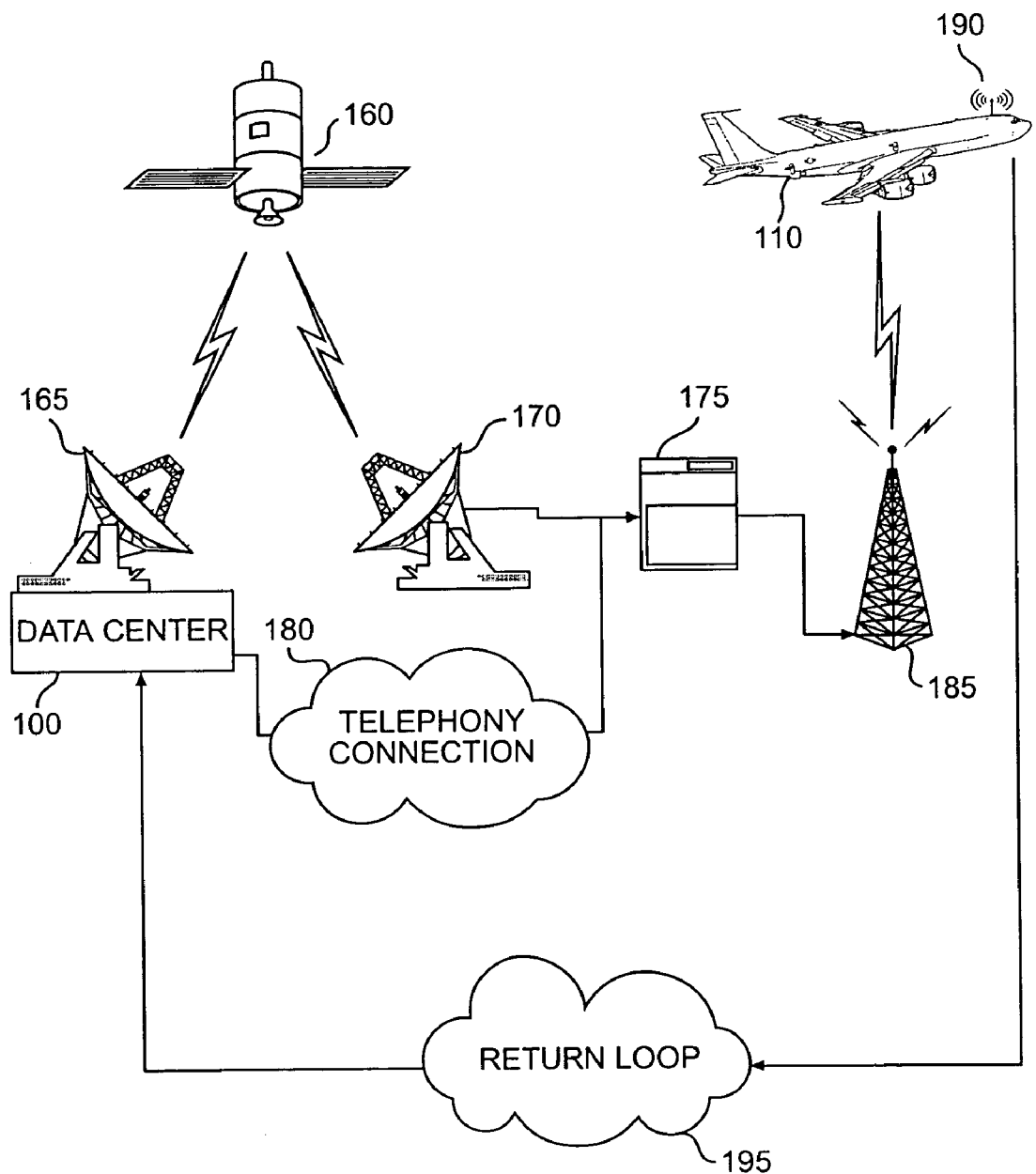
FIG. 4 is a schematic illustration of a VDL broadcast communication route according to still another preferred embodiment of the present invention.

FIG. 4 schematically depicts a preferred example of a VHF data link (VDL) broadcast option. The weather information is uplinked to a satellite 160 via an uplink facility 165 at the data center 100. The satellite 160, in turn, broadcasts the weather information throughout a region, where it is received by one or more ground-based receivers 170, such as a SATCOM® receiver, for example. From there, the weather information is fed to a processor 175, which customizes the information for a localized region. Alternatively, or as a backup, the weather information may be sent directly from the data center 100 to the processor 175 via a telephony connection 180. The processor forwards the customized weather information to a VHF transmitter 185, which in turn broadcasts the information throughout the localized region, where it is picked up by a VHF receiver 190 onboard the aircraft 110.

Optionally, the VDL broadcast option shown in FIG. 4 further includes a return loop 195 from the aircraft 110 back to the data center 100. Preferably, the return loop 195 is implemented through existing technology and equipment, such as ACARS or GTE Airfone®. Using the return loop 195, a user onboard the aircraft 110 can request the broadcast of specific weather information, including, for example, information that might not normally be broadcasted within the localized region in which the aircraft 110 is flying.

Figure 5:
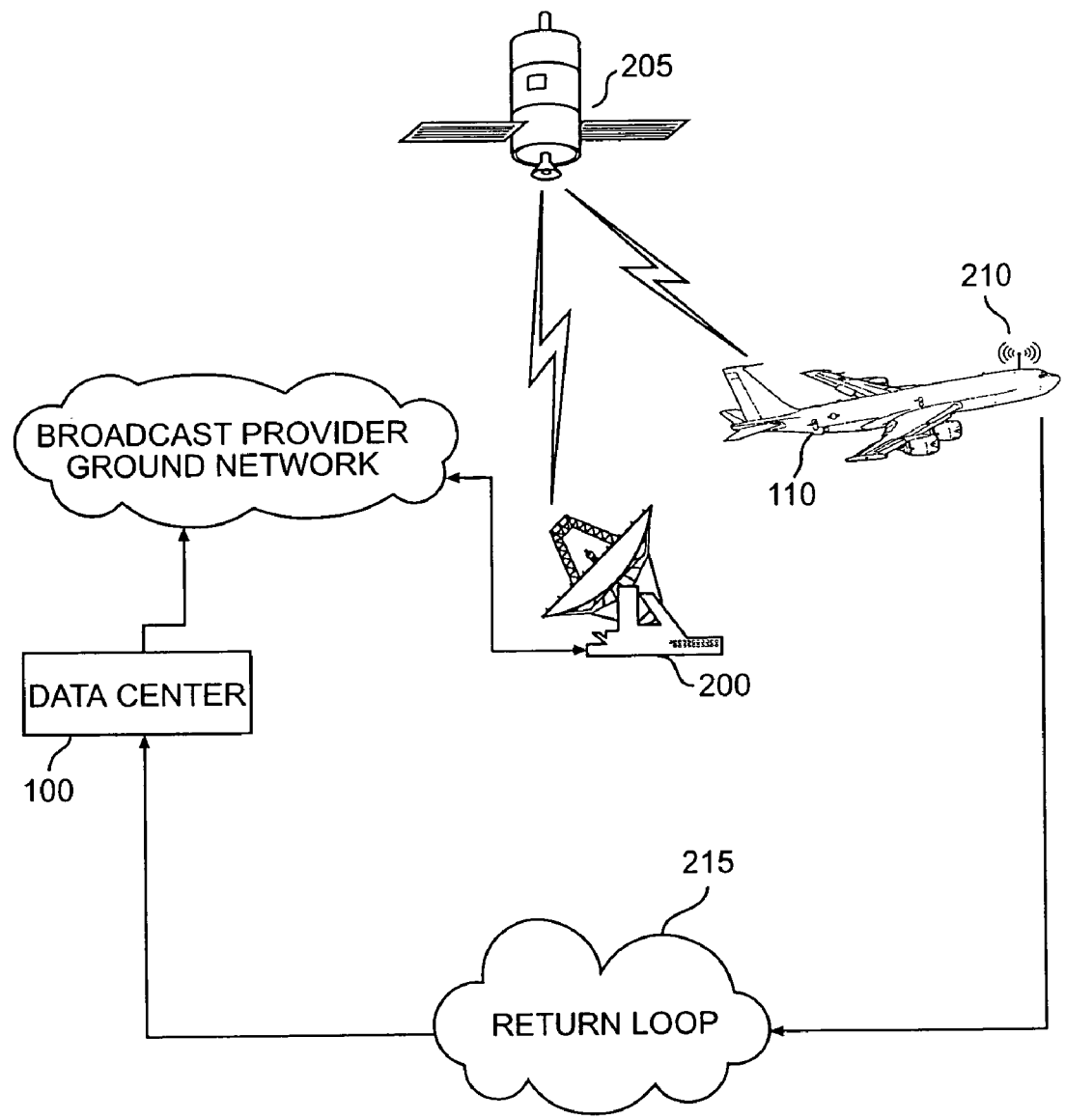
FIG. 5 is a schematic illustration of a satellite broadcast communication route according to yet another preferred embodiment of the present invention.
Figure 6:
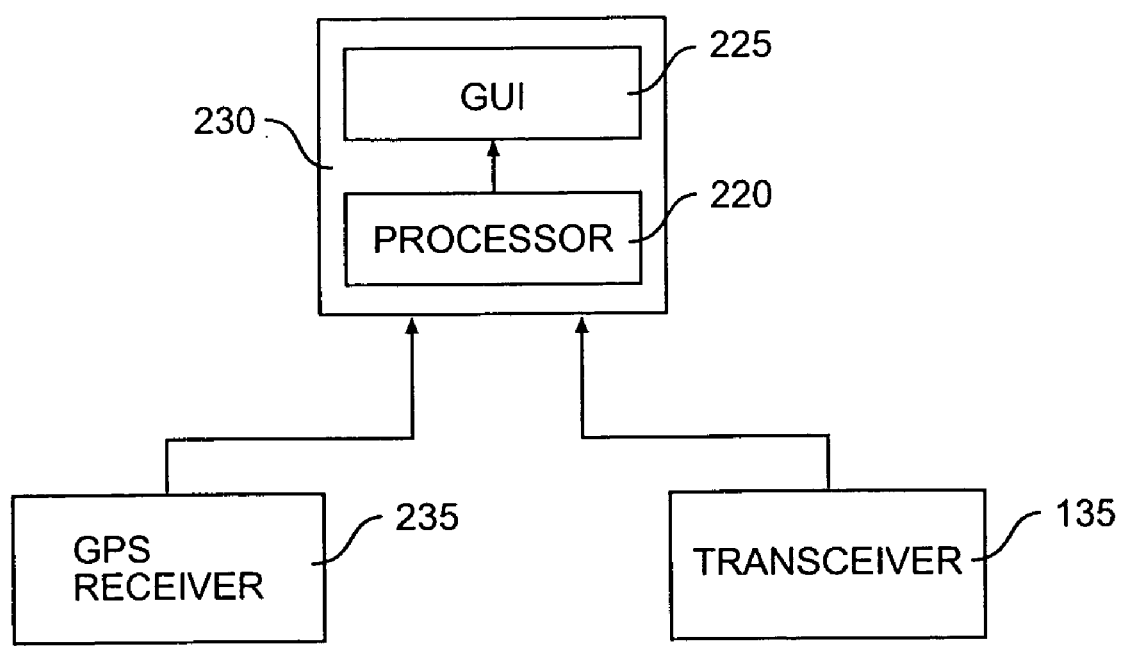
FIG. 6 is a schematic illustration of a preferred arrangement of aircraft-based equipment according to the present invention.

FIG. 5 schematically depicts a preferred example of a satellite broadcast option. The weather information is pushed to a satellite ground station 200, where it is uplinked to one or more orbiting satellites 205. The satellite 205, in turn, broadcasts the weather information throughout a region, where it is picked up by a satellite receiver 210, such as a SATCOM® unit, onboard the aircraft 100. The COMSAT® system, which utilizes the INMARSAT® satellite constellation, is one example of a satellite communication service that could be used in accordance with this embodiment of the present invention. Alternatively, another satellite communication service, such as the Satellite Digital Audio Radio System (SDARS), could be used. Like the VDL broadcast option described above, the satellite broadcast option can be provided with a return loop 215 for requesting the broadcast of specific weather information.

3. Airborne Equipment

The airborne equipment needed to implement the present invention includes an onboard transceiver 135, a processor 220, and a graphical user interface (GUI) 225. Preferably, the onboard transceiver 135 is an already existing unit, such as, for example, the GTE Airfone® system or a SATCOM® unit. The foregoing assumes that the chosen communication route is telephony. If instead one of the broadcast options is employed, then those skilled in the art will appreciate that a receiver may be used in place of a transceiver. Herein, the term "receiver" encompasses any device with receiving capabilities, including a transceiver. If a return loop is provided, then the aircraft should also be equipped with transmitting capabilities.

Once weather information is received onboard the aircraft 110, it is stored in the processor 220 until requested for display. When requested, the information is decompressed and rendered into a graphical presentation for display to the user.

In its most basic form, the processor 220 and GUI 225 can simply comprise a personal electronic device (PED) 230, such as a desktop or laptop PC, connected to the onboard transceiver 135, as shown in FIG. 6. The PED 230 is loaded with software for running a graphical weather program, such as described below. Preferably, the PED 230 is connected to a global positioning system (GPS) receiver 235. The GPS receiver 235 provides navigational information to the PED 230 concerning the aircraft's position, altitude, heading, and groundspeed. More preferably, the PED 230 is connected to a flight management computer (FMC) (not shown) that provides route information and waypoints in addition to the navigational information provided by the GPS 235. If neither a GPS receiver nor a FMC is provided, then such navigational and route information can be entered manually by the user.

Figure 7:
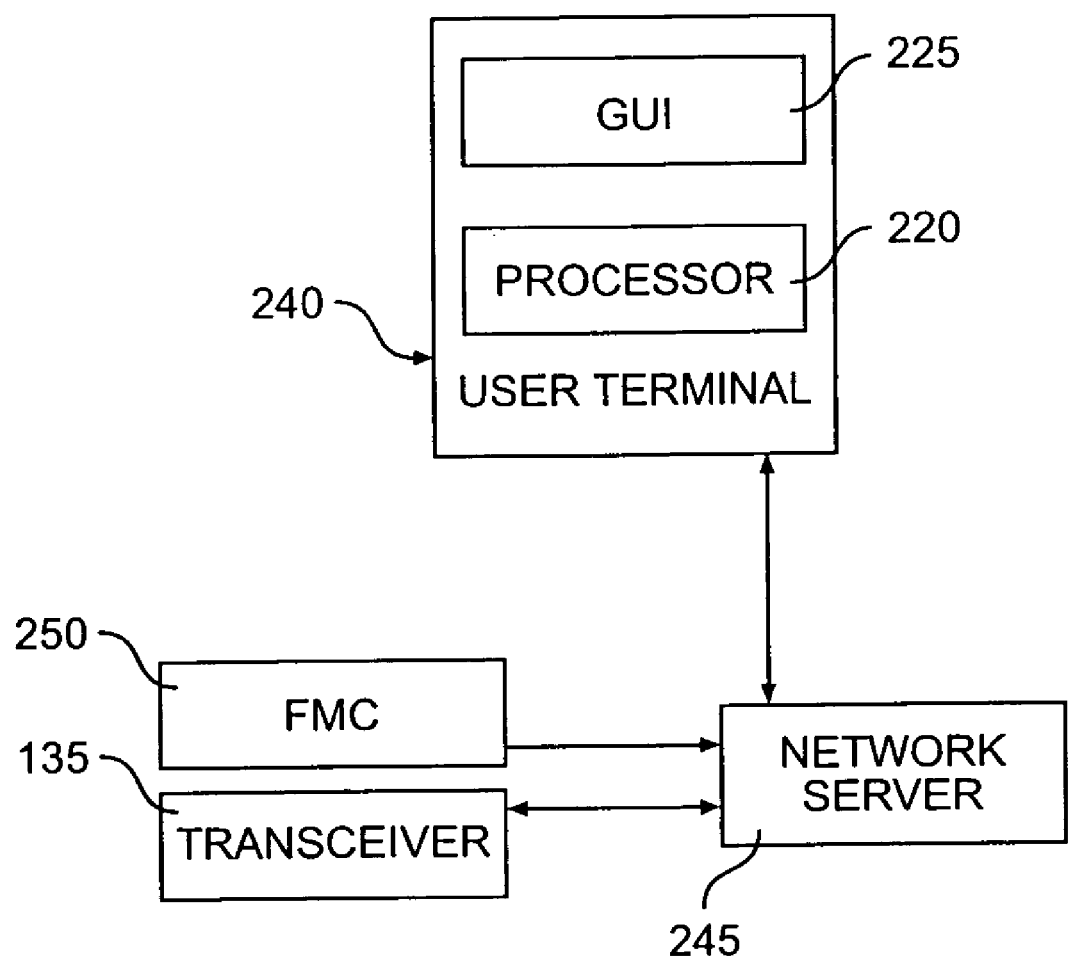
FIG. 7 is a schematic illustration of another preferred arrangement of aircraft-based equipment according to the present invention.

Alternatively, as shown in FIG. 7, the processor 220 and GUI 225 can be implemented in one or more user terminals 240, preferably located in the cockpit of aircraft 110. The user terminal 240 can be connected to a network server 245, which in turn is connected to the onboard transceiver 135 and either a GPS (not shown) or FMC 250. The network server 245 may also be provided with interfaces for connecting to other existing or future avionics equipment (not shown).

Figure 8:
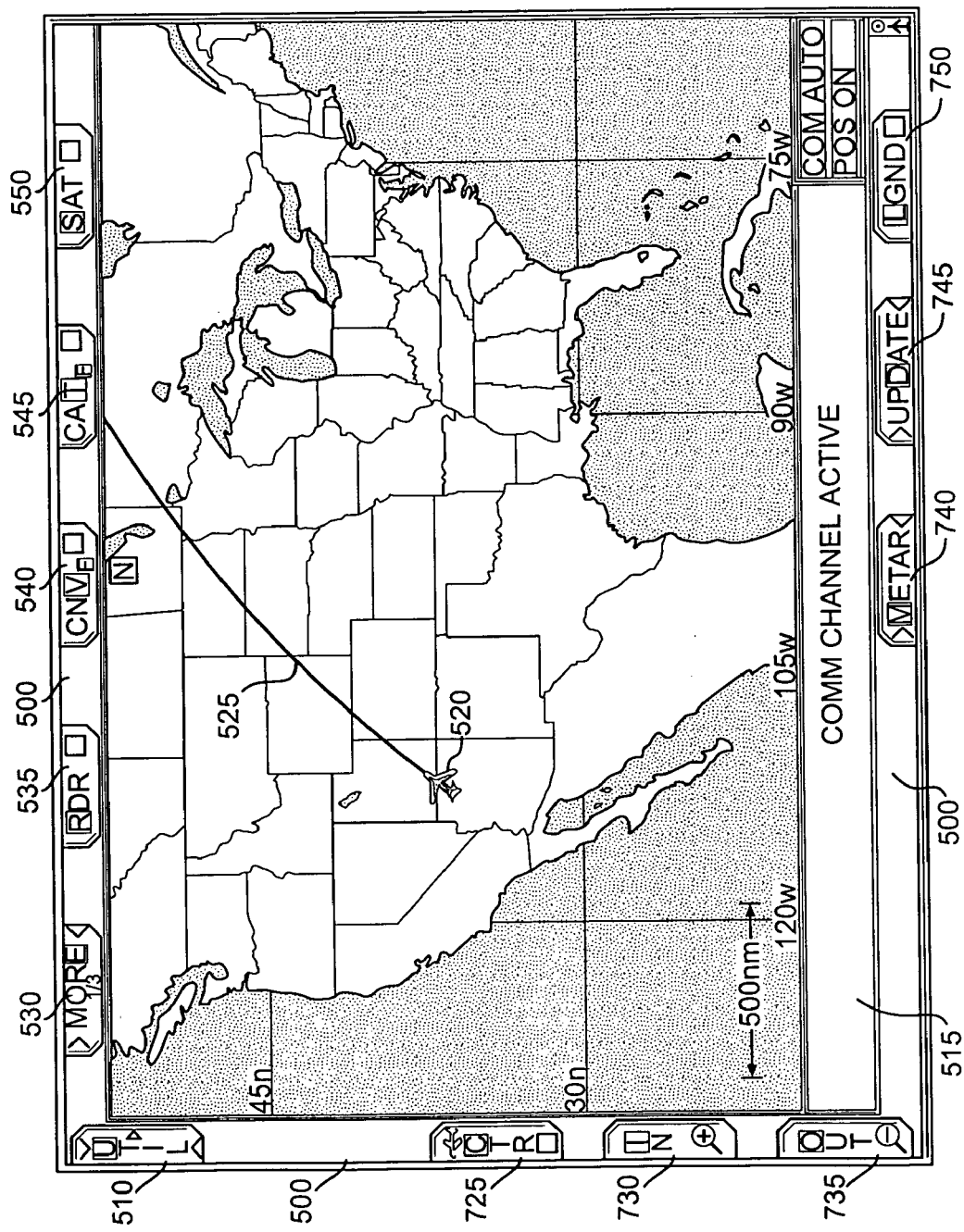
FIG. 8 is a typical screen display according to the present invention.
Figure 9:
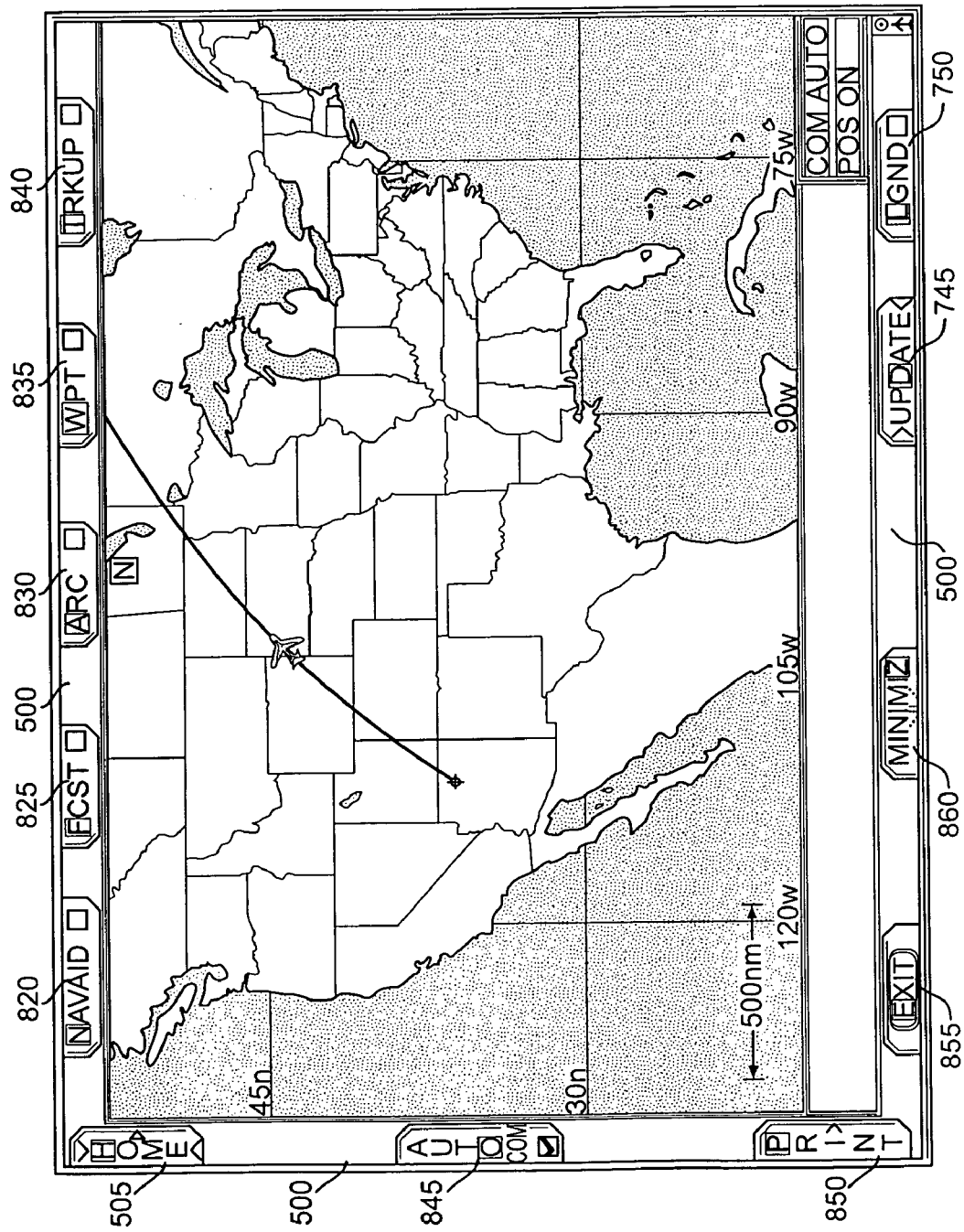
FIG. 9 is another typical screen display according to the present invention.

Upon request by the user, weather information for a geographic region is displayed on the GUI screen. Menus 500, such as shown in FIGS. 8 and 9, are provided along the sides of the display screen. Preferably, there are two different sets of menus—one corresponding to a home screen, shown in FIG. 8, and another corresponding to a utilities screen, shown in FIG. 9. These can be alternately displayed by selecting either a HOME option 505 or a UTIL option 510 on the utilities screen or the home screen, respectively. There is also a status window 515 near the bottom of the screen for displaying information concerning the operation of the weather program. Menu options may be selected using any of a number of known devices, such as a mouse, a bezel button interface, a touch screen overlay, or a keyboard.

The geographic region displayed in FIGS. 8 and 9 includes the continental United States and portions of Canada and Mexico. Other parts of the world can be displayed by scrolling the map up, down, left, or right.

Preferably, an airplane symbol 520 and projected flight route 525 are displayed on the map to indicate the aircraft's current position and route, as determined by the FMC or GPS receiver, or as manually input by the user. If available, the FMC or GPS receiver continually updates the position of the aircraft as the flight progresses.

Figure 10:
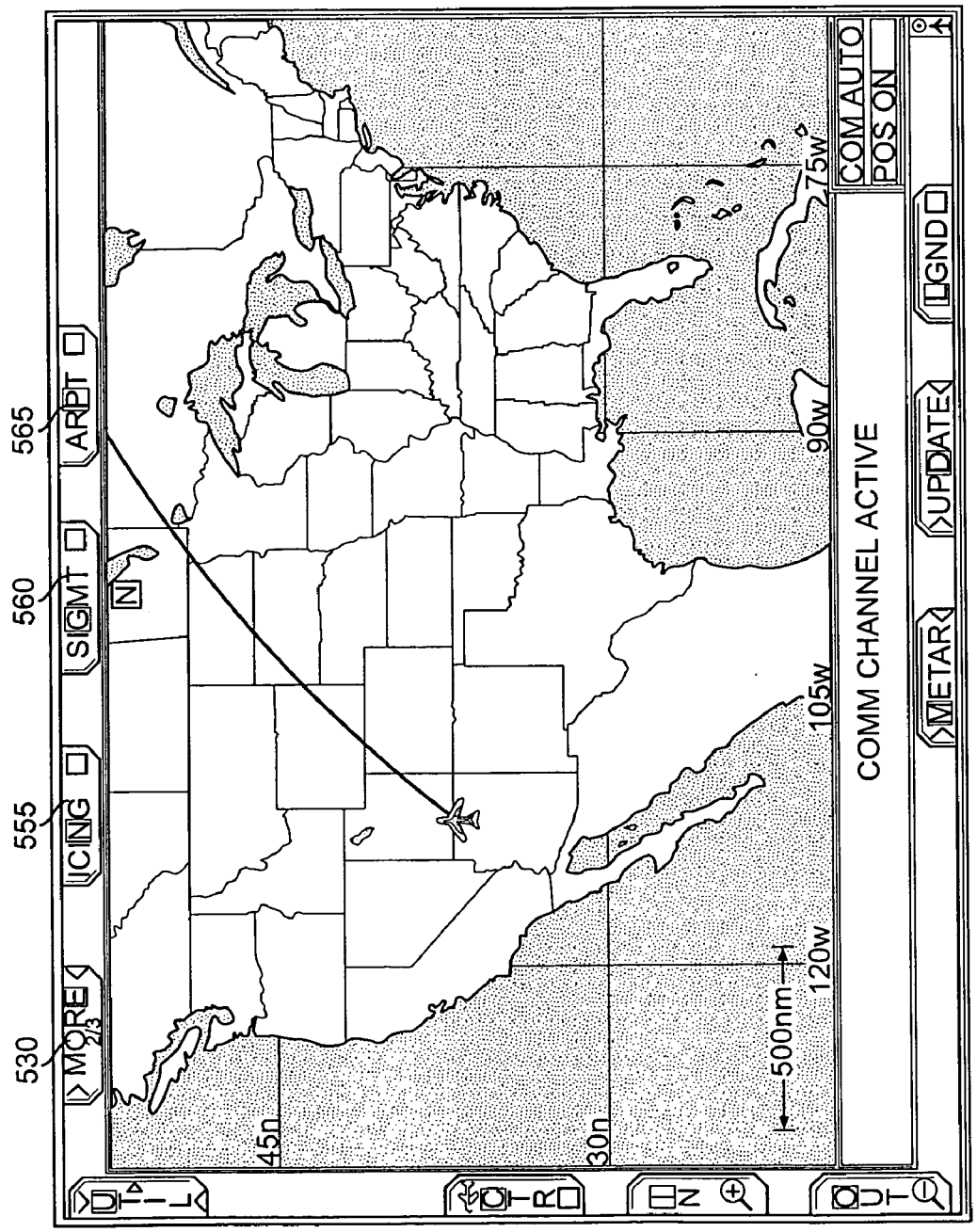
FIG. 10 is still another typical screen display according to the present invention.
Figure 11:
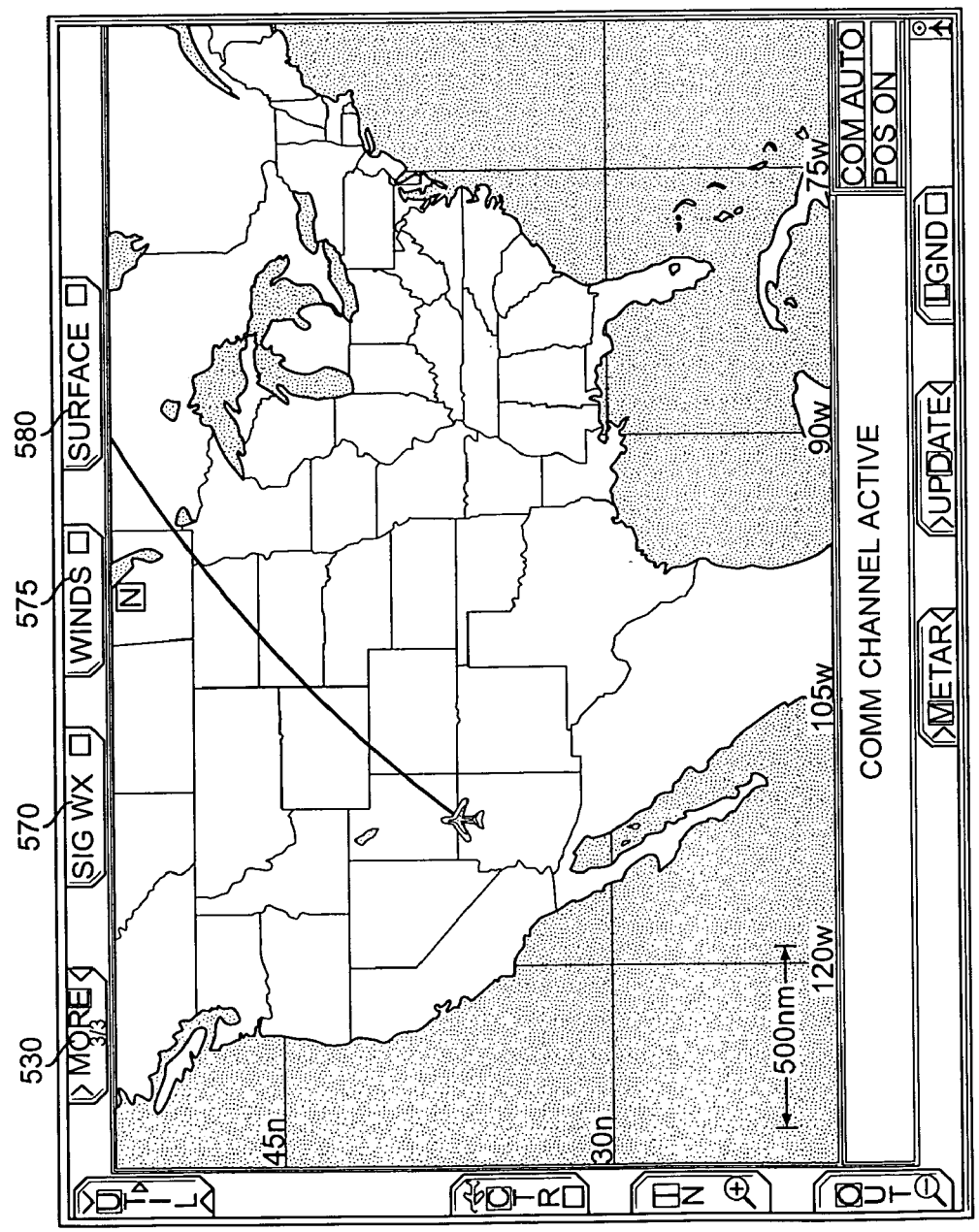
FIG. 11 is yet another typical screen display according to the present invention.

As seen in FIG. 8, the home screen has a top menu that preferably includes the following selectable options: MORE 530, RDR 535, CNV 540, CAT 545, and SAT 550. Selecting the MORE option 530 once displays the following options, which are shown in FIG. 10: ICING 555, SIGMT 560, and ARPT 565. Selecting the MORE option 530 a second time displays the following options, which are shown in FIG. 11: SIG WX 570, WINDS 575, and SURFACE 580.

Figure 12:
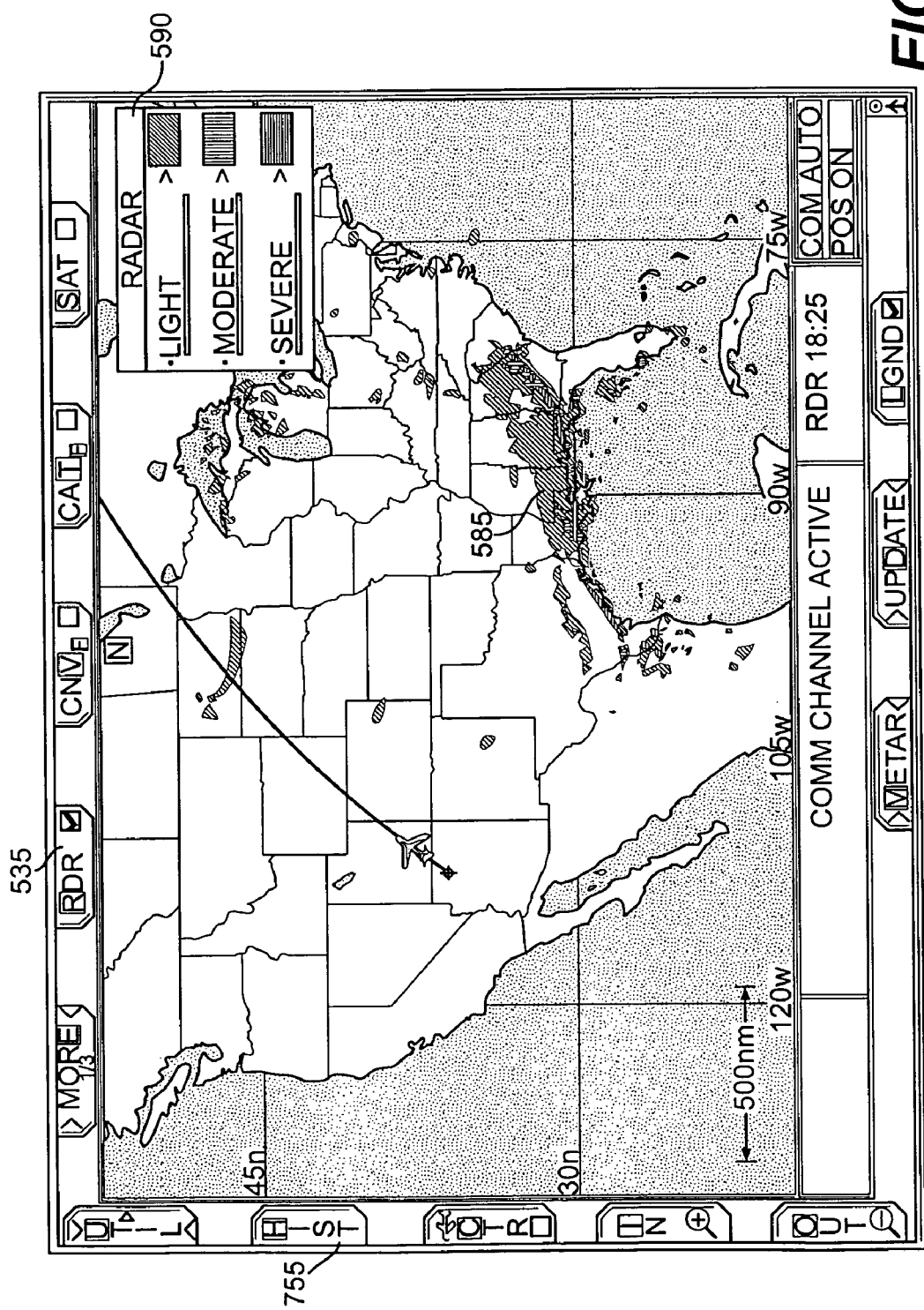
FIG. 12 is a typical screen display illustrating a preferred weather radar mosaic feature of the present invention.

FIG. 12 illustrates a typical screen display resulting from selection of the RDR option 535. Weather radar mosaic images 585, representing areas of precipitation, are shown superimposed on the map. Preferably, the radar images 585 are displayed in multiple colors indicative of the relative severity of the precipitation. A legend 590 indicates what each color signifies.

Figure 13:
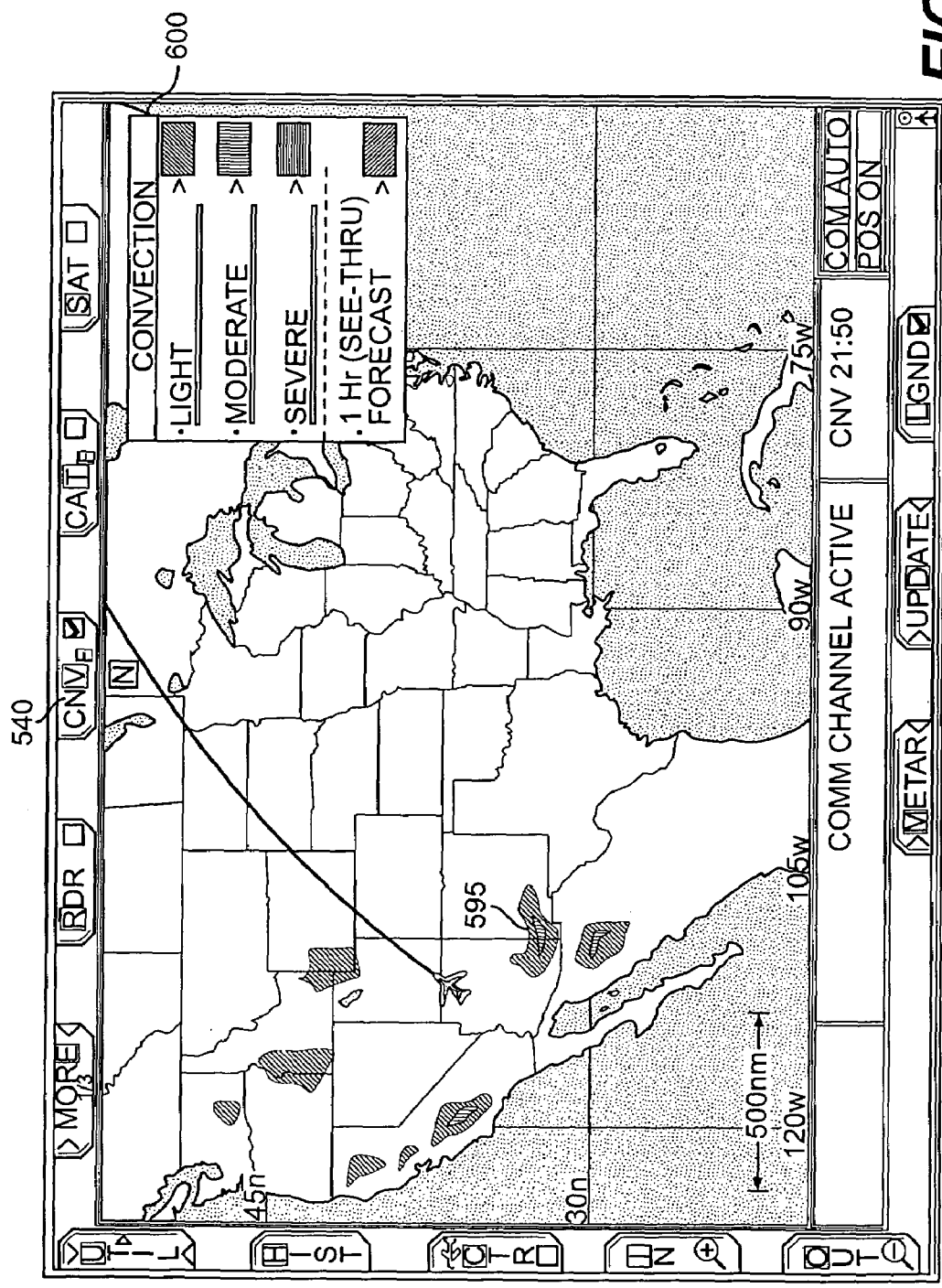
FIG. 13 is a typical screen display illustrating a preferred convection feature of the present invention.

FIG. 13 illustrates a typical screen display resulting from selection of the CNV option 540. Areas of convective activity 595 are displayed on the map, preferably, in multiple colors indicative of the relative severity of the convective activity in a particular area. A legend 600 indicates what each color signifies.

Figure 14:
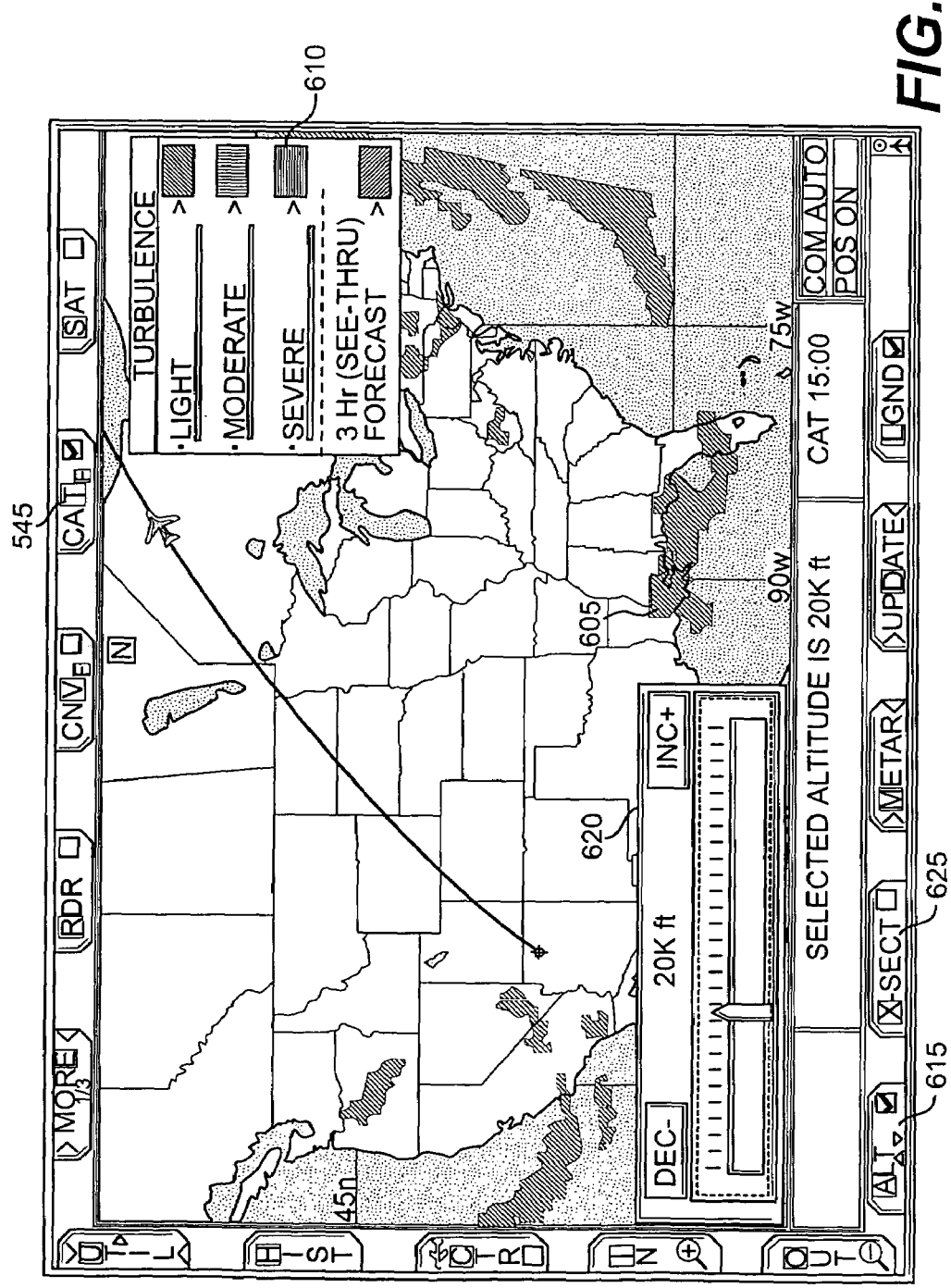
FIG. 14 is a typical screen display illustrating a preferred turbulence feature of the present invention.
Figure 15:
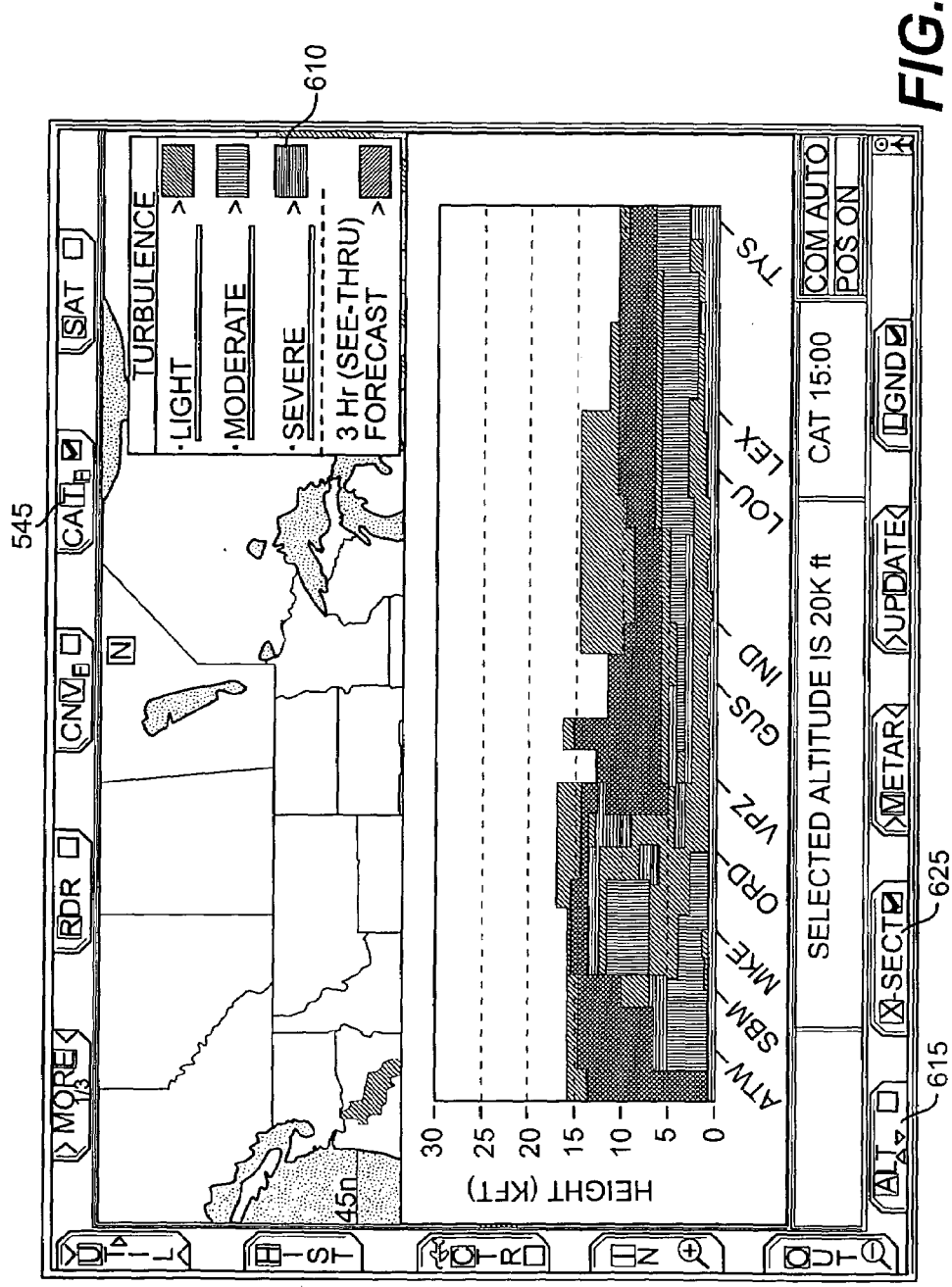
FIG. 15 is a typical screen display illustrating a preferred aspect of the turbulence feature shown in FIG. 14.

FIG. 14 illustrates a typical screen display resulting from selection of the CAT option 545. Areas of clear air turbulence 605 are displayed on the map, preferably, in multiple colors indicative of the relative severity of the turbulence in a particular area. A legend 610 indicates what each color signifies. Since turbulence data is altitude specific, an ALT option 615 is provided near the bottom of the screen for changing the altitude of the displayed turbulence data. Specifically, selecting the ALT option 615 brings up an adjustable altitude bar 620 that enables the user to view turbulence data for different altitudes. The default altitude is set at the current altitude of the aircraft, as determined by the GPS or FMC, or as manually entered by the user. Preferably, there is also provided a X-SECT option 625 which, when selected, displays turbulence data in a cross-section taken along the flight route, such as illustrated in FIG. 15. In that way, the user can view turbulence data for different altitudes simultaneously.

Figure 16:
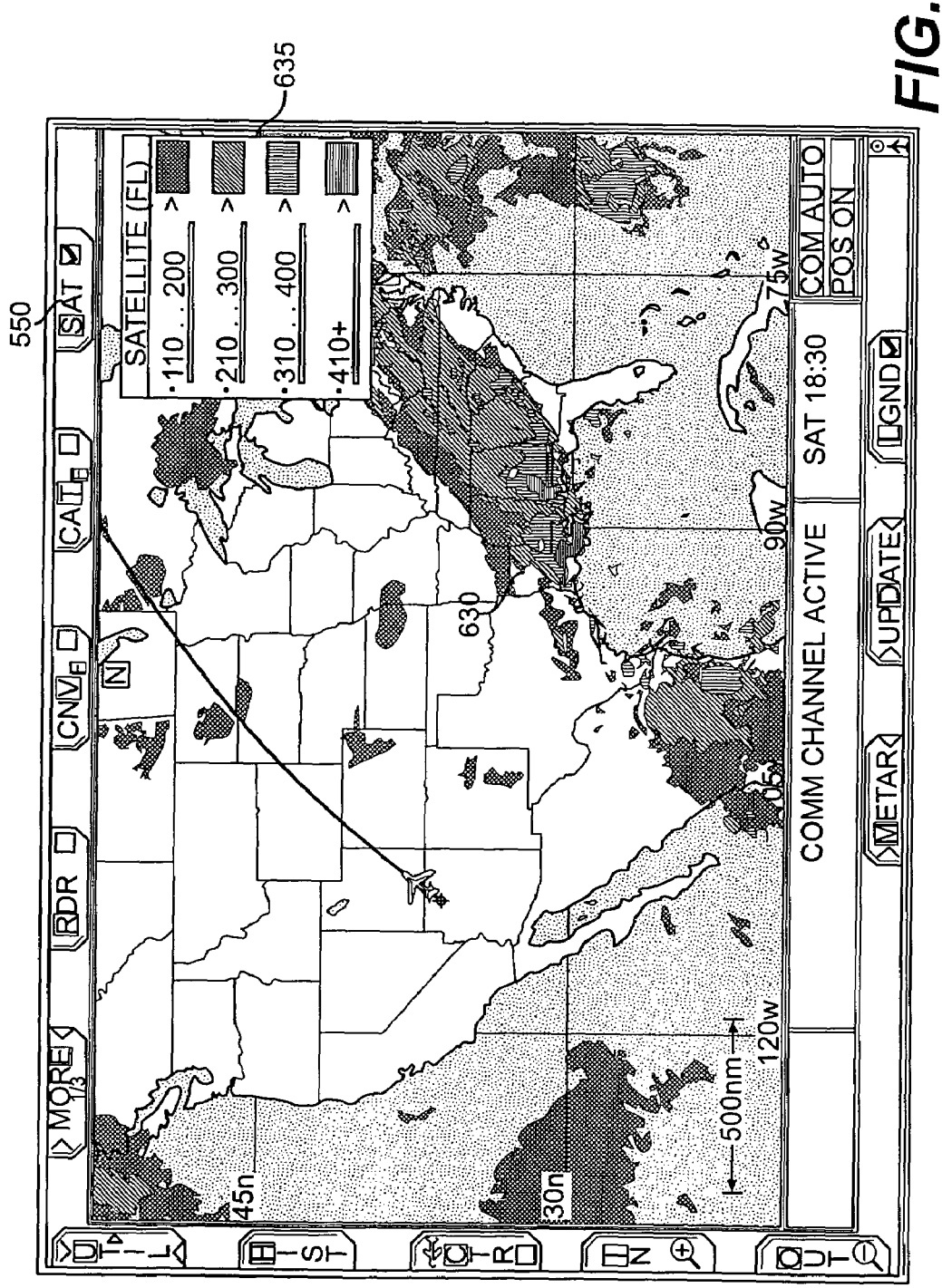
FIG. 16 is a typical screen display illustrating a preferred weather satellite feature component of the present invention.

FIG. 16 illustrates a typical screen display resulting from selection of the SAT option 550. Weather satellite images 630, representing cloud cover, are shown superimposed on the map. Preferably, the satellite images are displayed in varying shades or colors indicative of the altitude of the clouds. A legend 635 indicates what each shade or color signifies.

Figure 17:
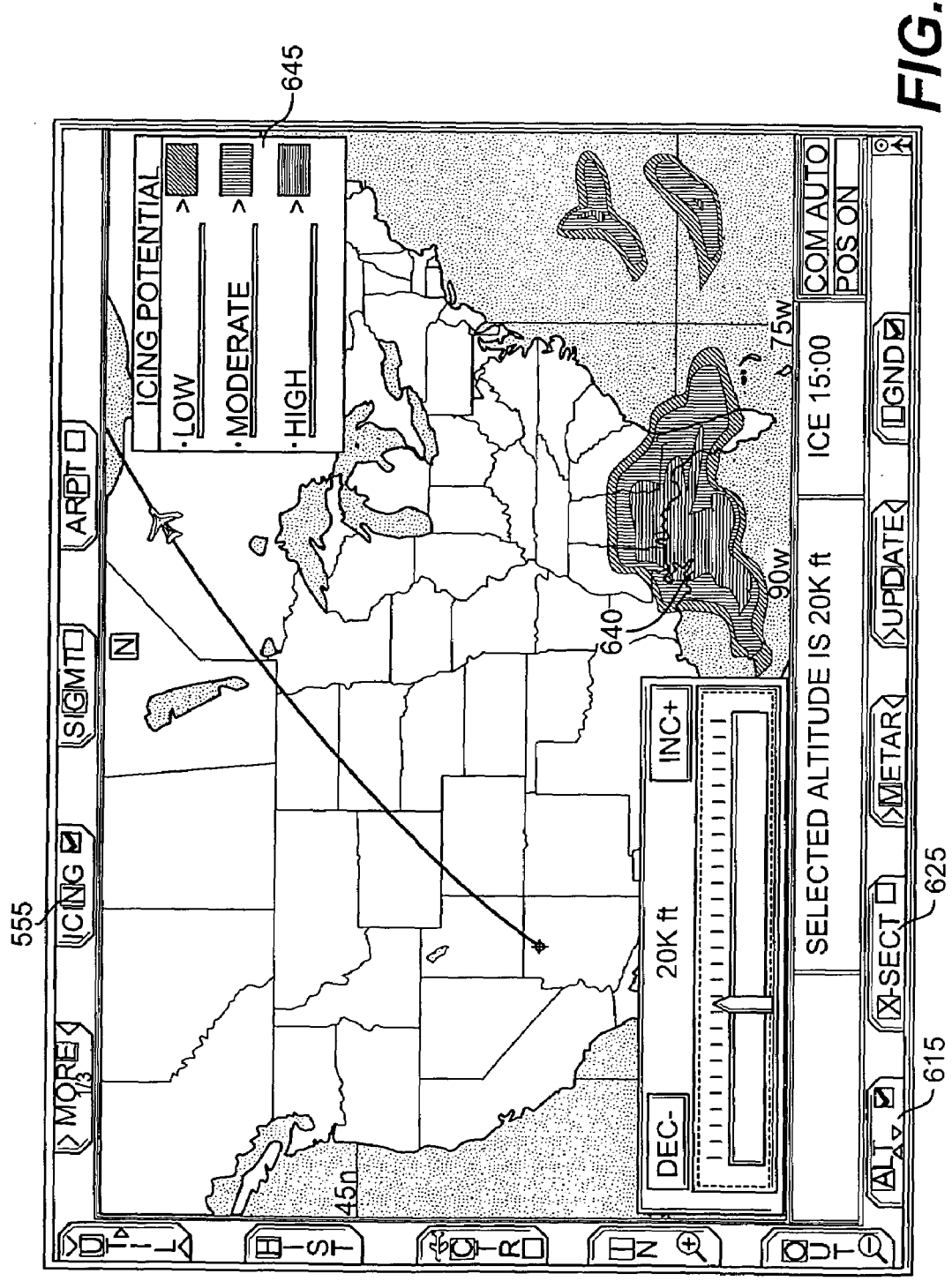
FIG. 17 is a typical screen display illustrating a preferred icing feature of the present invention.

FIG. 17 illustrates a typical screen display resulting from selection of the ICING option 555. Icing hazards 640 are displayed on the map, preferably, in different colors indicative of whether the icing potential for a particular area is low, moderate, or high. A legend 645 indicates what each color signifies. Icing data, like turbulence data, is altitude specific. Therefore, ALT and X-SECT options 615, 625 are preferably provided.

Figure 18:
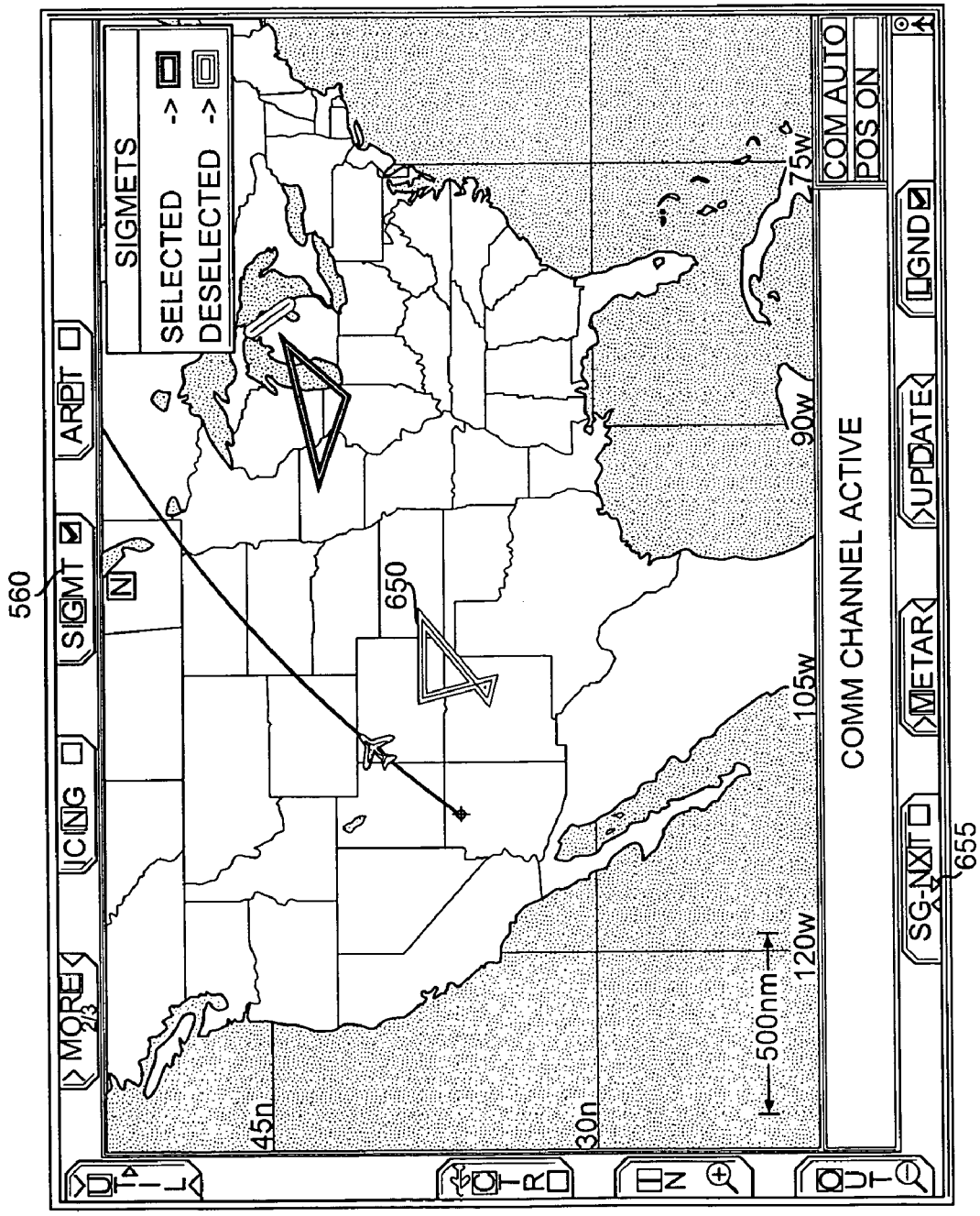
FIG. 18 is a typical screen display illustrating a preferred SIGMET feature of the present invention.

FIG. 18 illustrates a typical screen display resulting from selection of the SIGMT option 560. Areas affected by SIGMETs are shown as geometric shapes 650 on the map.

Figure 19:
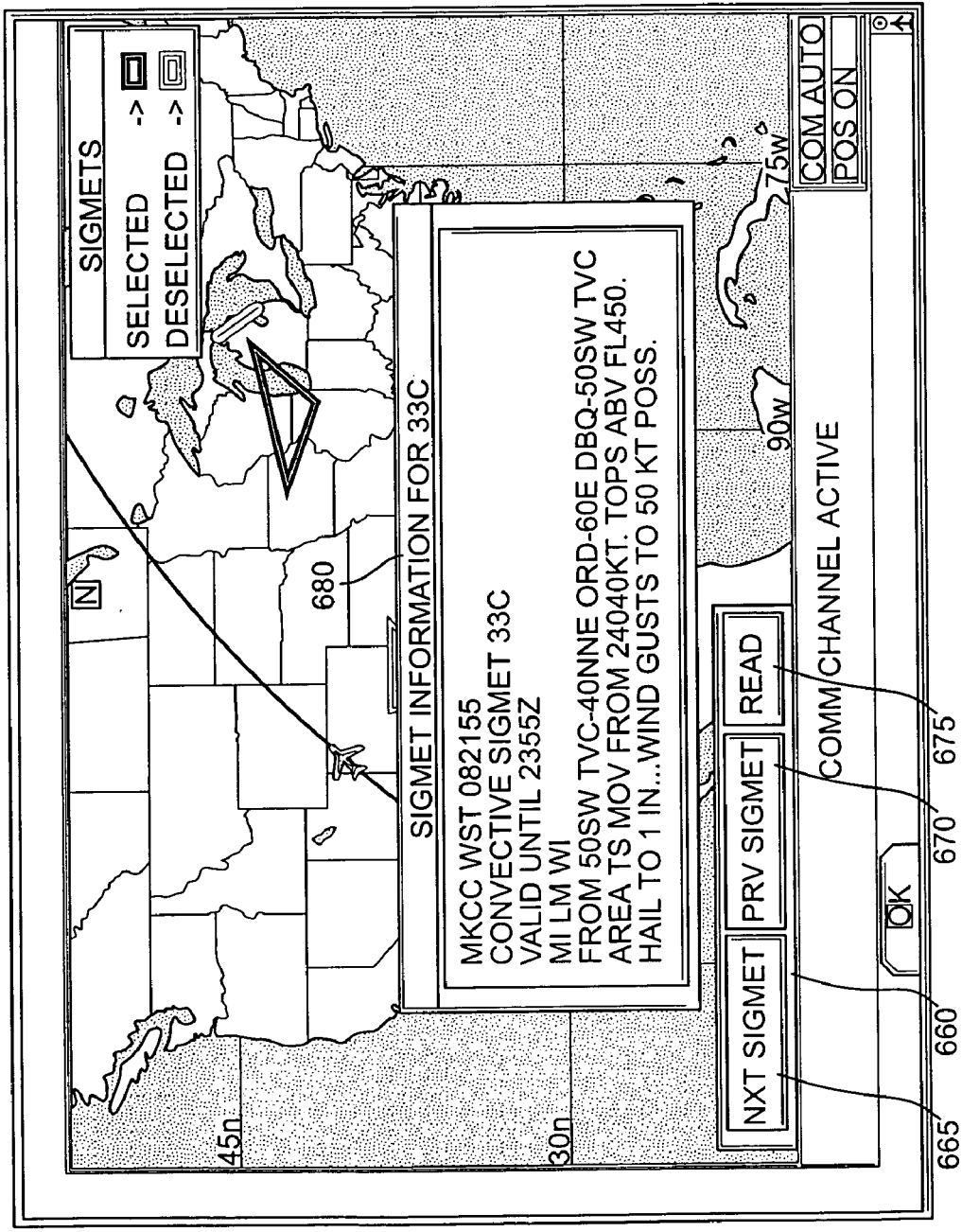
FIG. 19 is a typical screen display illustrating a preferred aspect of the SIGMET feature shown in FIG. 18.

Selecting a SG-NXT option 655 near the bottom of the screen causes a toolbar 660 to appear, such as shown in FIG. 19. The toolbar 660 contains three selectable options: NXT SIGMET 665, PRV SIGMET 670, and READ 675. Selecting the READ option 675 opens a window 680 that contains a textual description for one of the displayed SIGMETs. The NXT SIGMET and PRV SIGMET options 665, 670 enable the user to read textual descriptions for other displayed SIGMETs.

The graphical depiction of areas affected by SIGMETs is a valuable tool to pilots. Prior to the present invention, pilots had to visualize the location of a SIGMET based on the text of the SIGMET message itself, which, as FIG. 20 demonstrates, is not an easy task. In fact, failure to recognize the location or magnitude of a SIGMET is known to have been a contributing factor in aircraft crashes.

Figure 20:
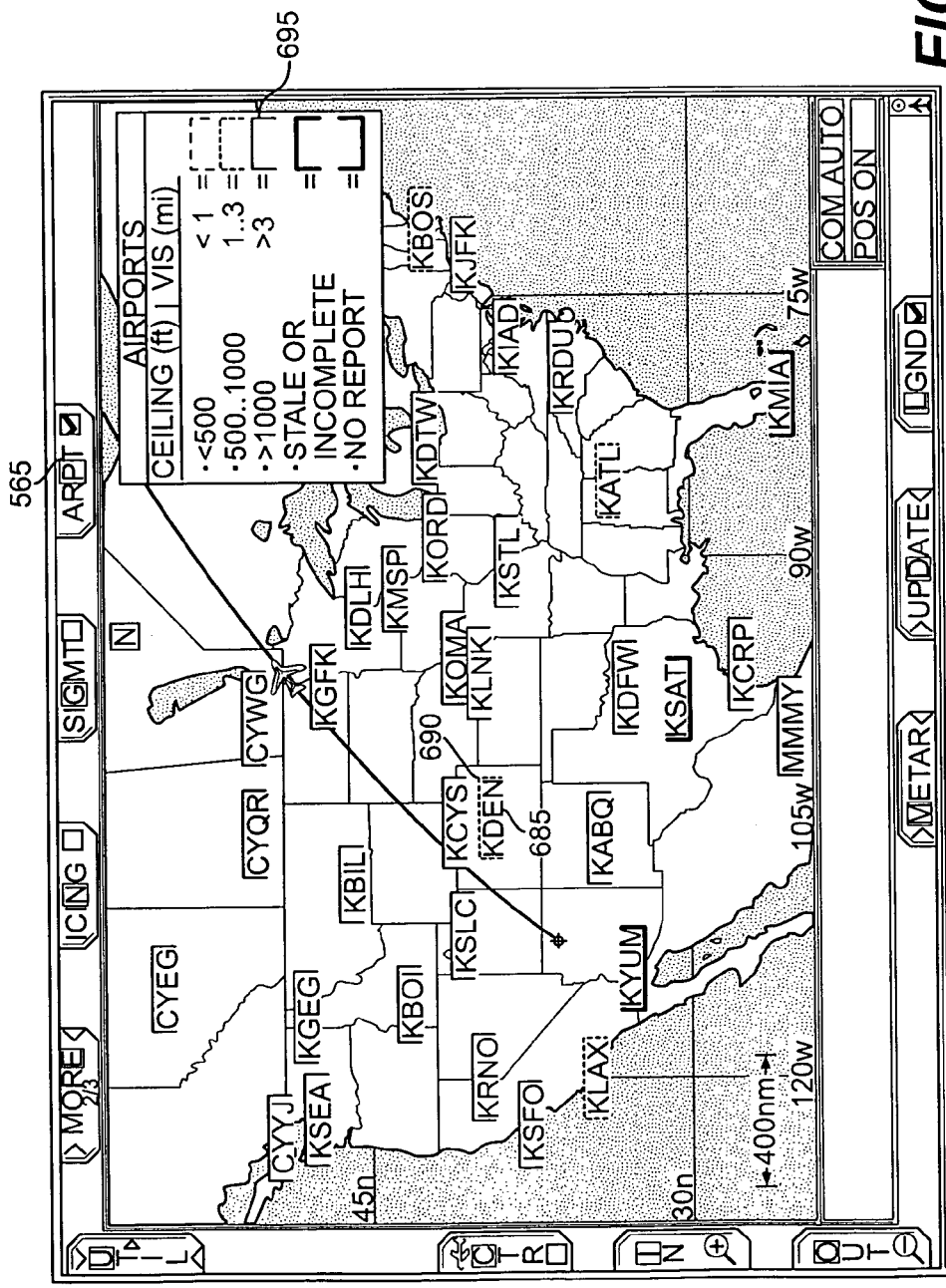
FIG. 20 is a typical screen display illustrating a preferred METAR and TAF feature of the present invention.
Figure 21:
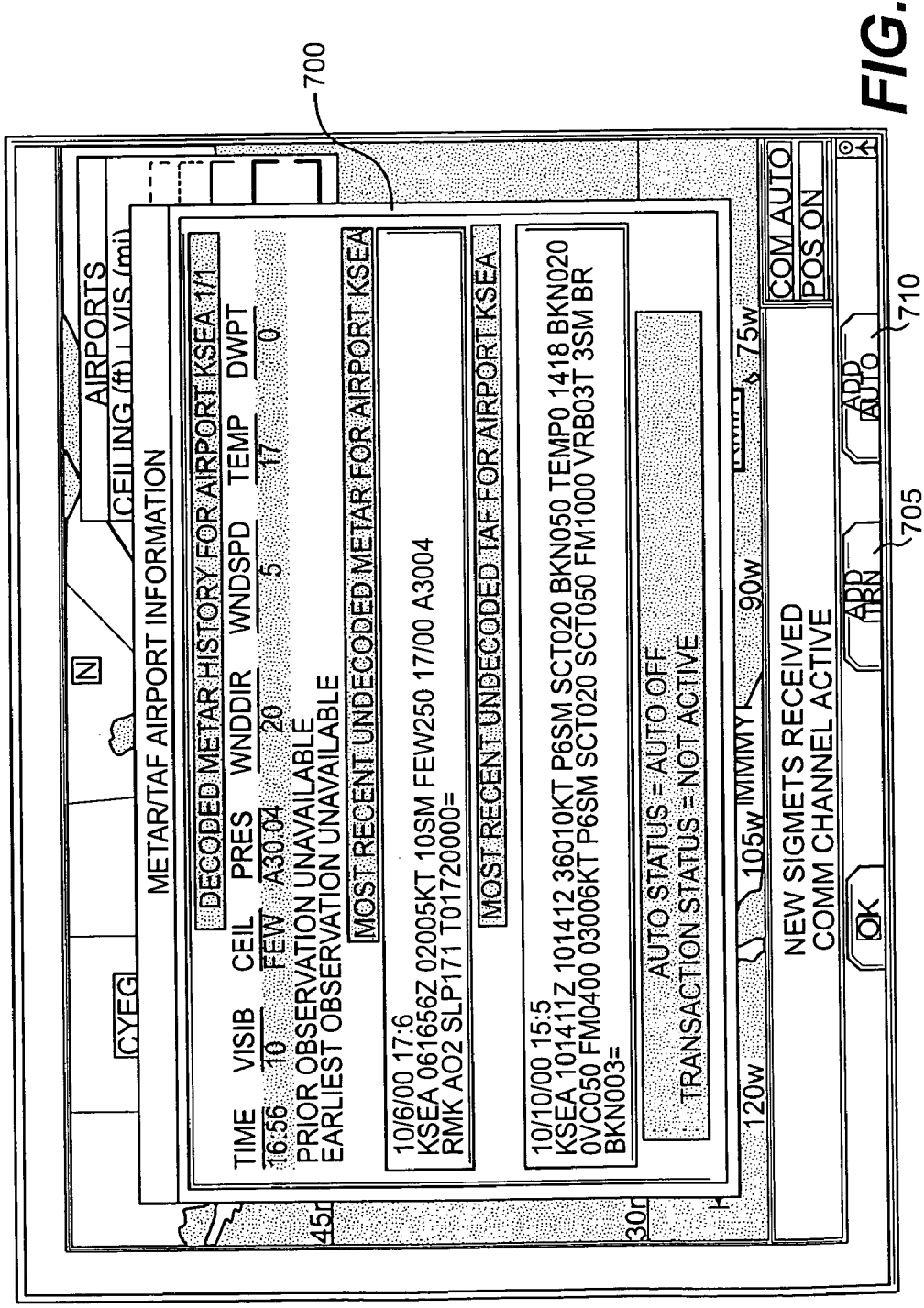
FIG. 21 is a typical screen display illustrating a preferred aspect of the METAR and TAF feature shown in FIG. 20.

FIG. 20 illustrates a typical screen display resulting from selection of the ARPT option 565. A four-letter code 685 for each METAR within the displayed region is displayed on the map, along with a color-coded symbol 690 indicating key information about the airport from which that METAR was generated, such as visibility and ceiling height. A legend 695 indicates what each color-coded symbol means. Selecting a METAR on the map causes a window 700 to open, such as shown in FIG. 21. The window 700 contains textual METAR and TAF information corresponding to the chosen airport. Along with the window 700, two additional menu options appear near the bottom of the screen. One of these options, ADD TRN 705, allows the user to request a one-time update for the selected METAR. The other option, ADD AUTO 710, adds the selected METAR to a list of METARs that periodically are updated automatically.

Figure 22:
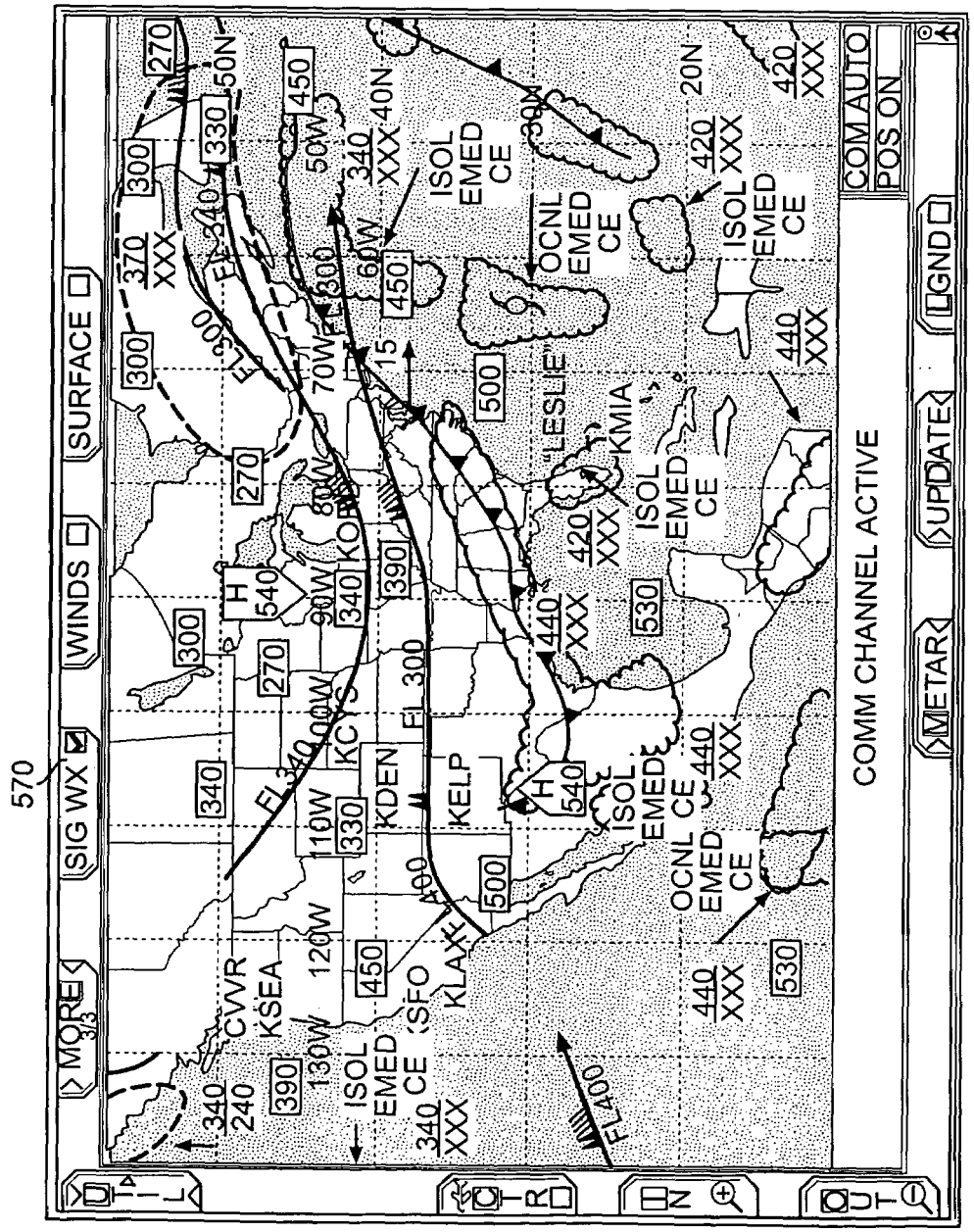
FIG. 22 is a typical screen display illustrating a preferred significant weather prognosis feature of the present invention.

FIG. 22 illustrates a typical screen display resulting from the selection of the SIG WX option 570. This display graphically depicts the most recent high-level significant weather prognosis for the displayed region.

Figure 23:
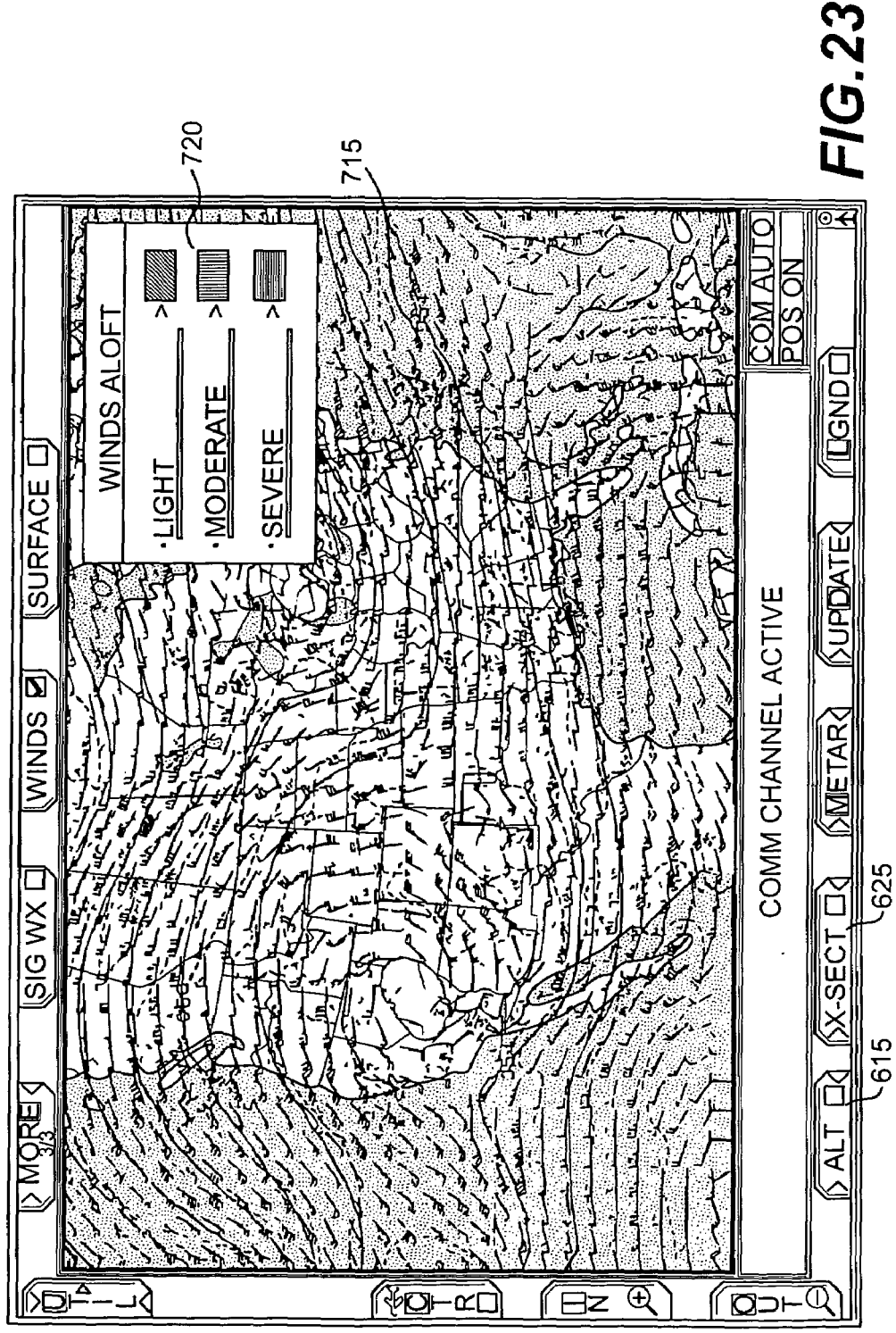
FIG. 23 is a typical screen display illustrating a preferred winds aloft feature of the present invention.

FIG. 23 illustrates a typical screen display resulting from the selection of the WINDS option 575. Streamlines 715 indicate the direction of winds aloft, and colors or shades indicate the intensity of such winds. A legend 720 indicates what each color or shade signifies. Because winds aloft data is altitude specific, ALT and X-SECT options 615, 625 are also preferably provided.

Figure 24:
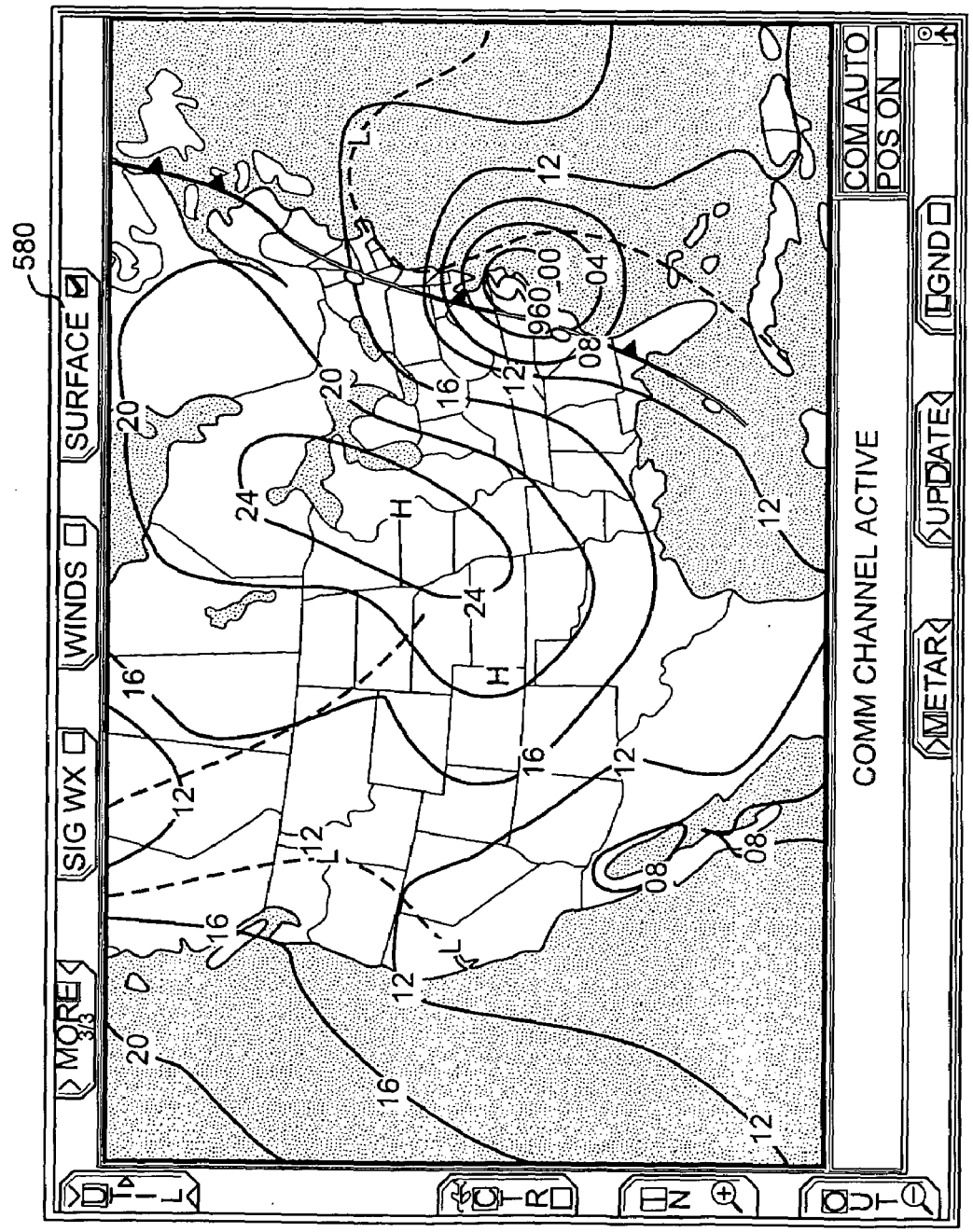
FIG. 24 is a typical screen display illustrating a preferred surface analysis feature of the present invention.

FIG. 24 illustrates a typical screen display resulting from the selection of the SURFACE option 580. This display graphically depicts surface analysis data, including areas of high and low pressure centers, ridges and troughs, and lines of constant pressure.

The home screen shown in FIG. 8 also has left and bottom menus that preferably include the following options: UTIL 510, CTR 725, IN 730, OUT 735, METAR 740, UPDATE 745, and LGND 750. Additionally, a HIST option 755, such as shown in FIG. 12, may be provided for certain weather components.

Figure 25:
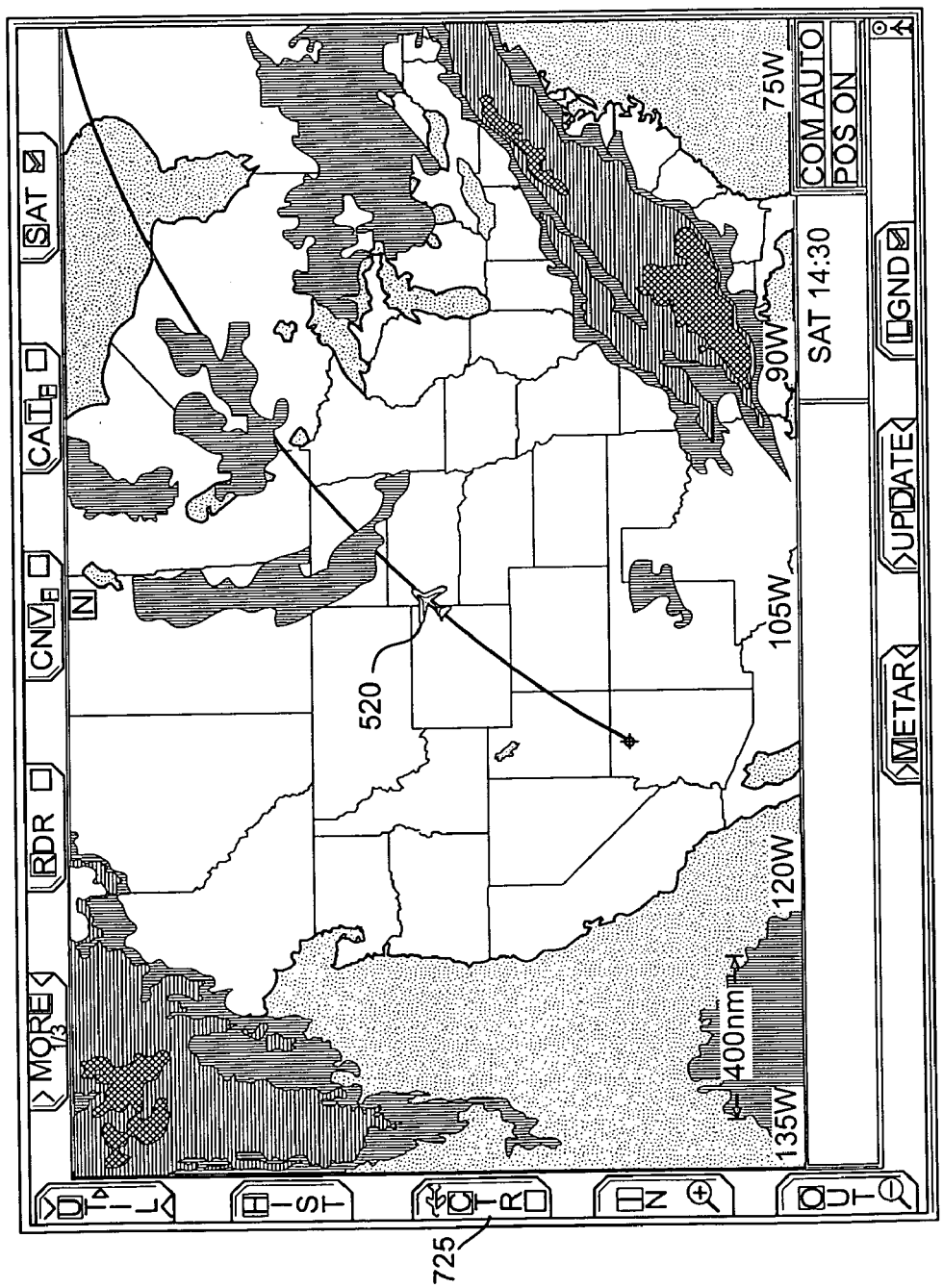
FIG. 25 is a typical screen display illustrating a preferred centering feature of the present invention.

Selecting the CTR option 725 causes the map to move so that the airplane symbol 520 is in the center of the display, such as shown in FIG. 25. As long as the CTR option 725 remains selected, the airplane symbol 520 will remain in the center of the display.

Figure 26:
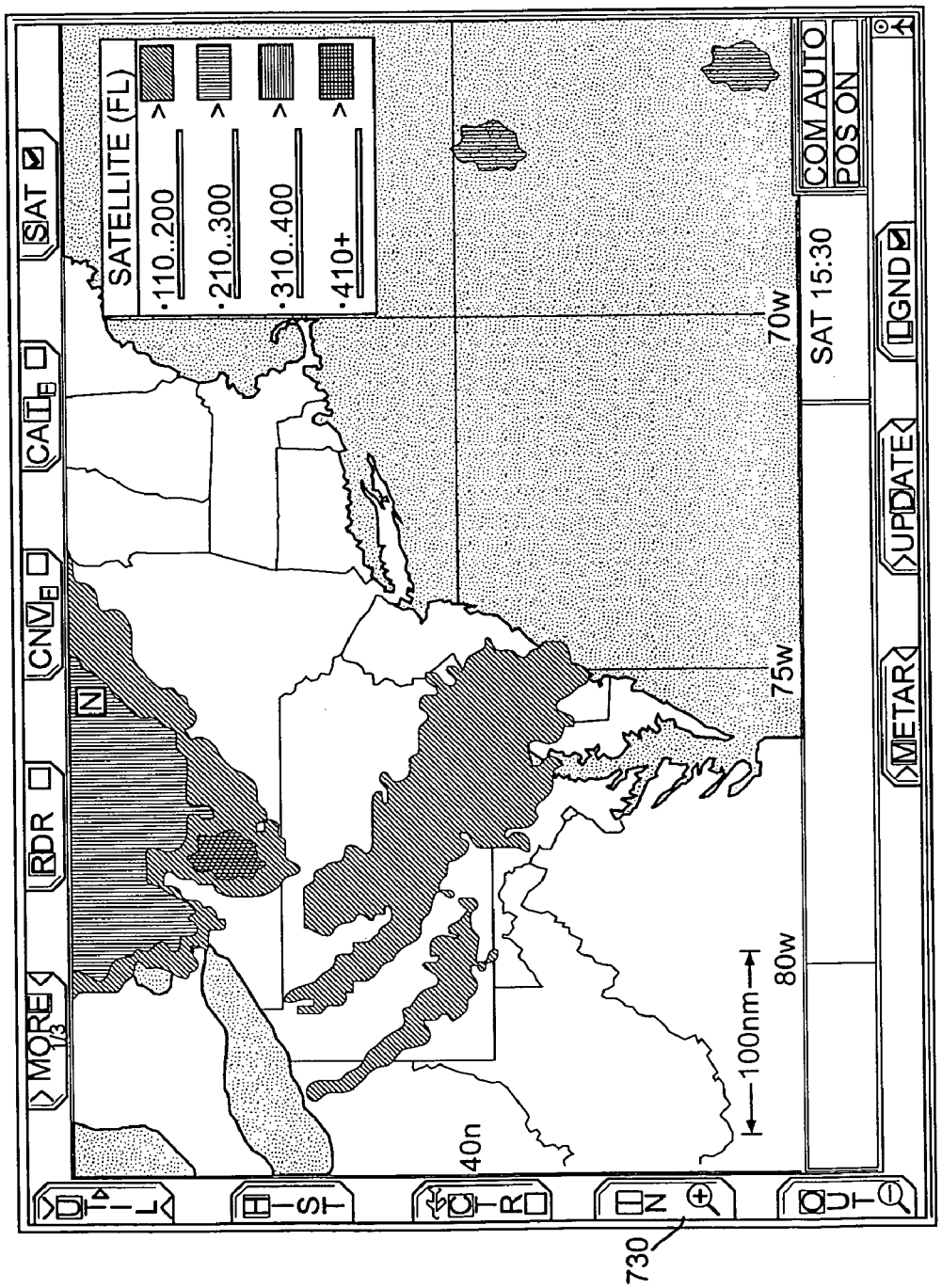
FIG. 26 is a typical screen display illustrating a preferred zoom in feature of the present invention.
Figure 27:
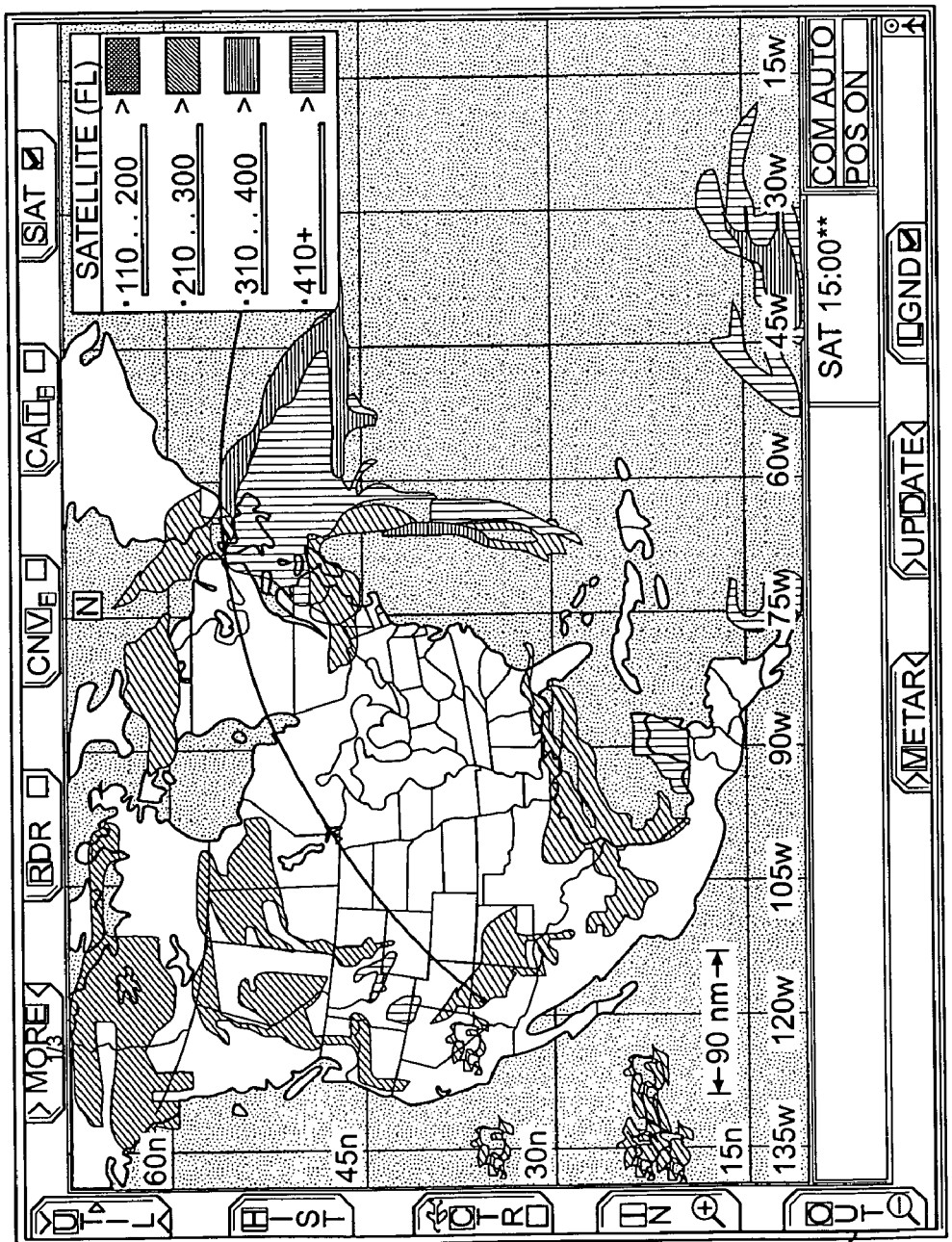
FIG. 27 is a typical screen display illustrating a preferred zoom out feature of the present invention.

Selecting the IN option 730 zooms the display in, such as shown in FIG. 26. Conversely, selecting the OUT option 735 zooms the display out, such as shown in FIG. 27.

Figure 28:
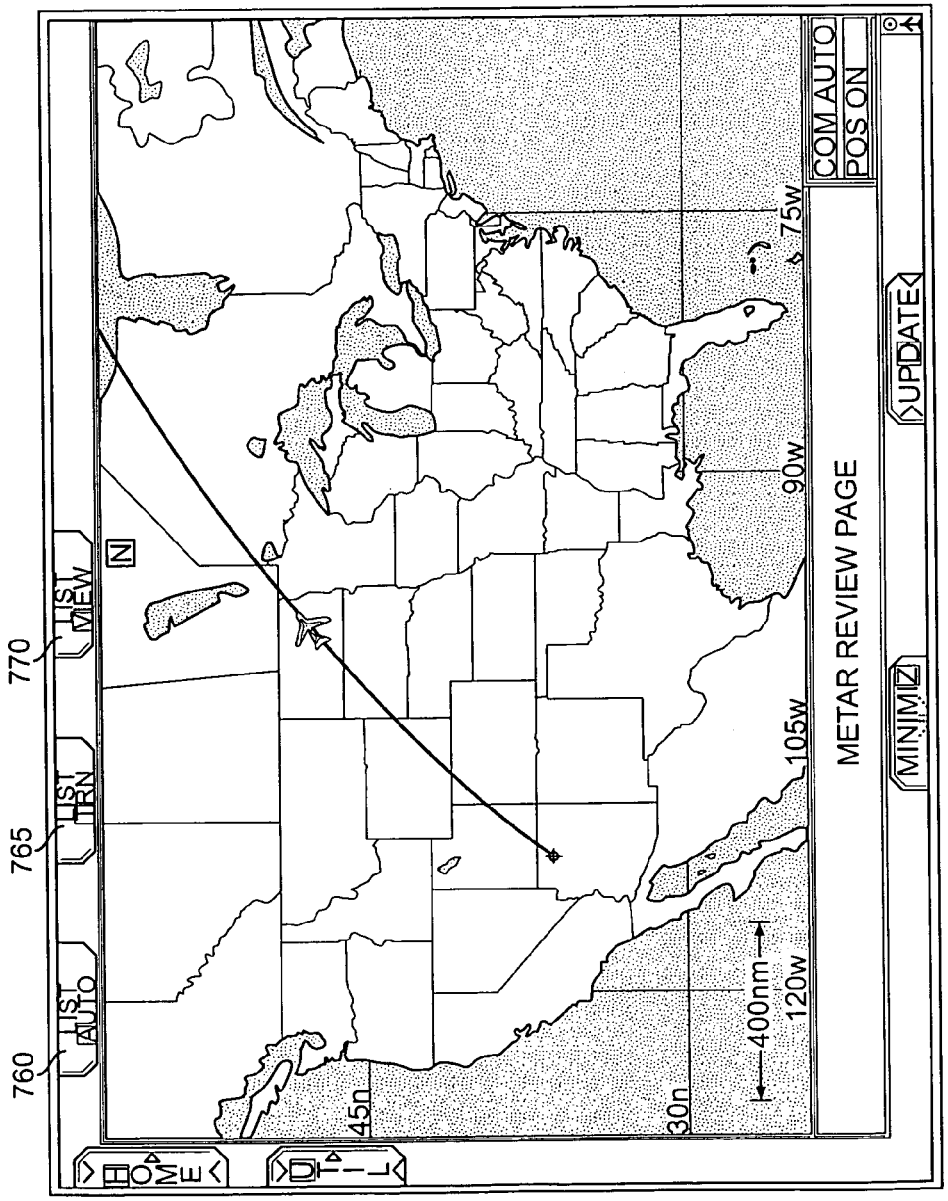
FIG. 28 is a typical screen display illustrating another preferred METAR and TAF feature of the present invention.

Selecting the METAR option 740 results in the display of three additional menu options, shown in FIG. 28. They are LIST AUTO 760, LIST TRN 765, and LIST VIEW 770. Each of these options allows the user to select a specific METAR for viewing from a list.

Figure 29:
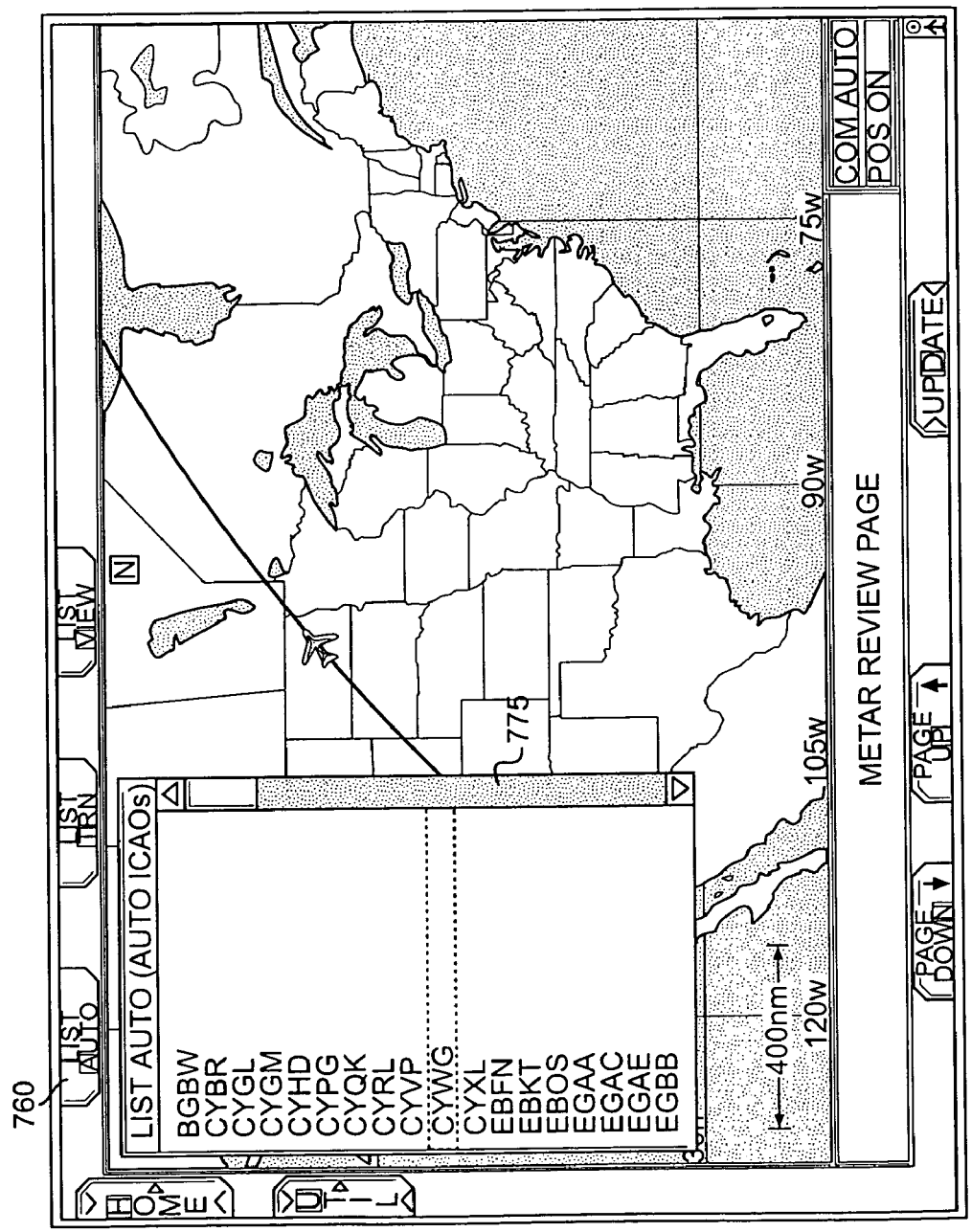
FIG. 29 is a typical screen display illustrating a preferred aspect of the METAR and TAF feature shown in FIG. 28.

Selecting the LIST AUTO option 760, for example, brings up a scrollable list 775 of METARs for which the program is automatically requesting updates, such as shown in FIG. 29. The text for a specific METAR can be viewed by selecting that METAR from the list 775. At start-up, the default set of automatically-requested METARs may include those associated with the flight route. Other METARs can be added to the list by selecting the ADD AUTO option 710 discussed above in connection with FIG. 21. METARs also can be deleted from the list by selecting a DELETE AUTO option (not shown) that appears after a METAR has been selected for viewing from the list 775.

Figure 30:
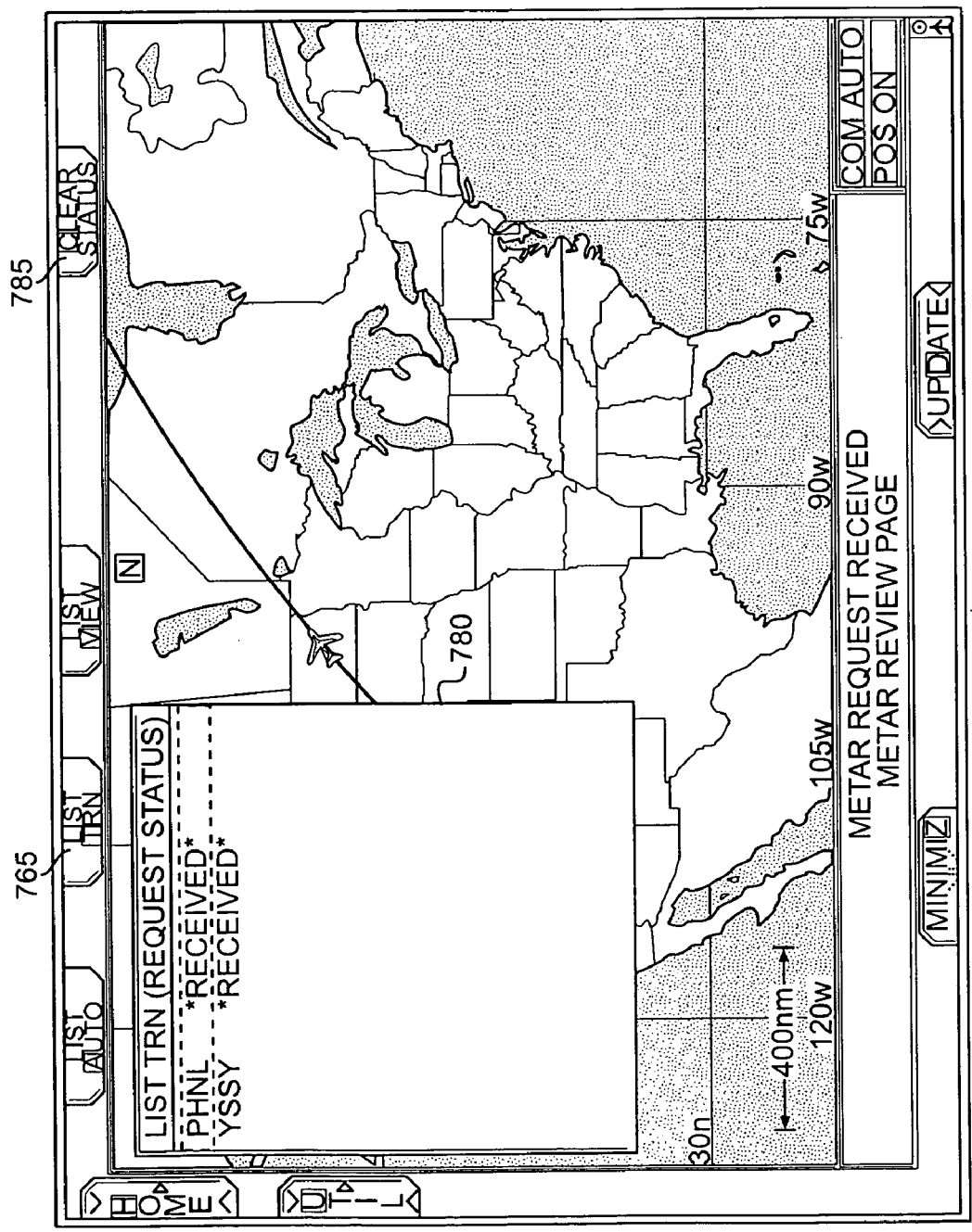
FIG. 30 is a typical screen display illustrating another preferred aspect of the METAR and TAF feature shown in FIG. 28.

Selecting the LIST TRN option 765 brings up a scrollable list 780 of METARs for which the user has manually requested an update, such as shown in FIG. 30. The text for a requested METAR can be viewed by selecting that METAR from the list 780. The user can request an updated METAR, and hence add it to the list 780, by selecting the ADD TRN option 705 discussed above in connection with FIG. 21. The transactional list 780 can be cleared by selecting a CLEAR STATUS option 785 that appears in the upper right corner of the screen.

Figure 31:
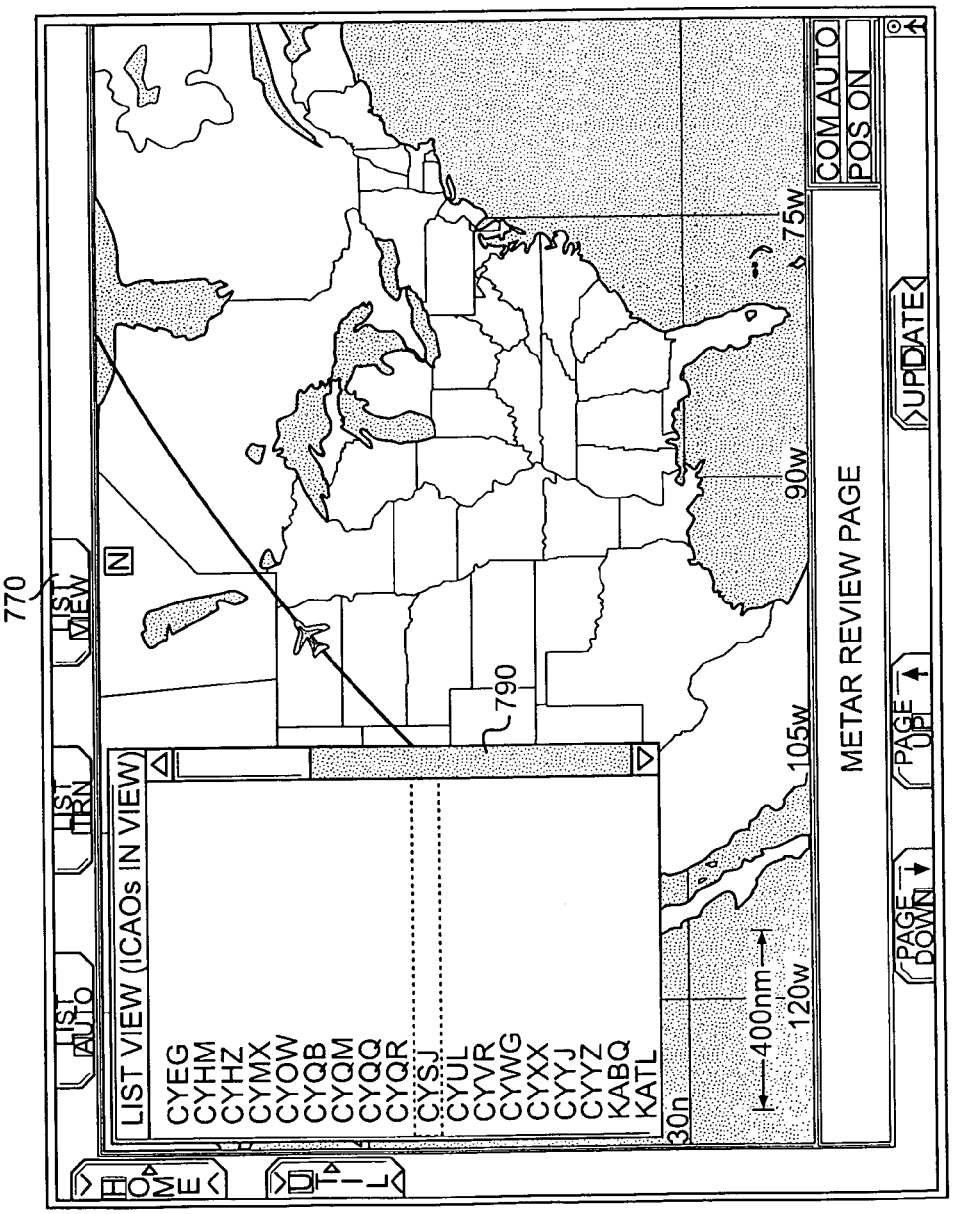
FIG. 31 is a typical screen display illustrating still another preferred aspect of the METAR and TAF feature shown in FIG. 28.

Selecting the LIST VIEW option 770 brings up a scrollable list 790 of METARs corresponding to airports located within the displayed region, such as shown in FIG. 31. The text for a specific METAR can be viewed by selecting that METAR from the list 790.

Figure 32:
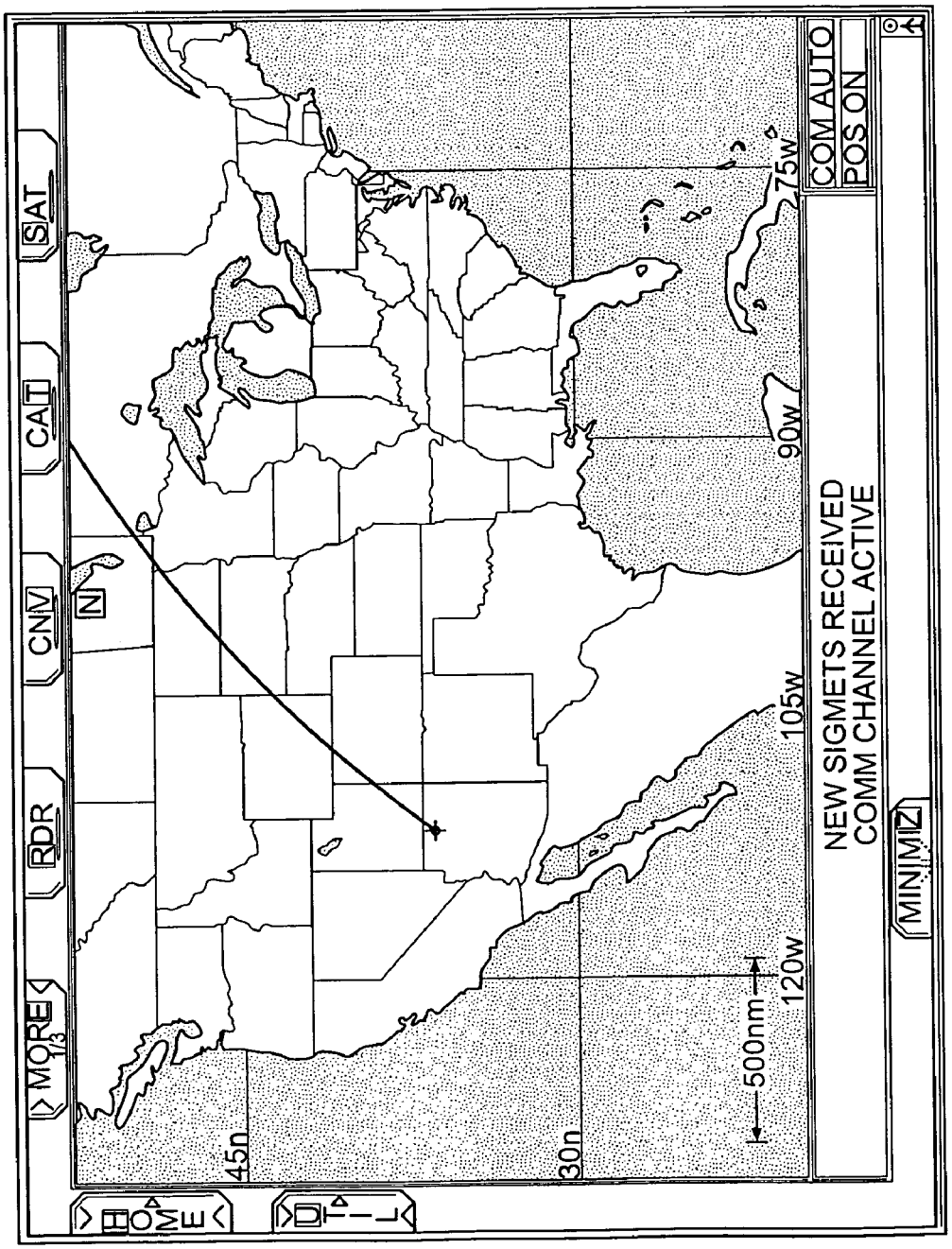
FIG. 32 is a typical screen display illustrating a preferred update feature of the present invention.
Figure 33:
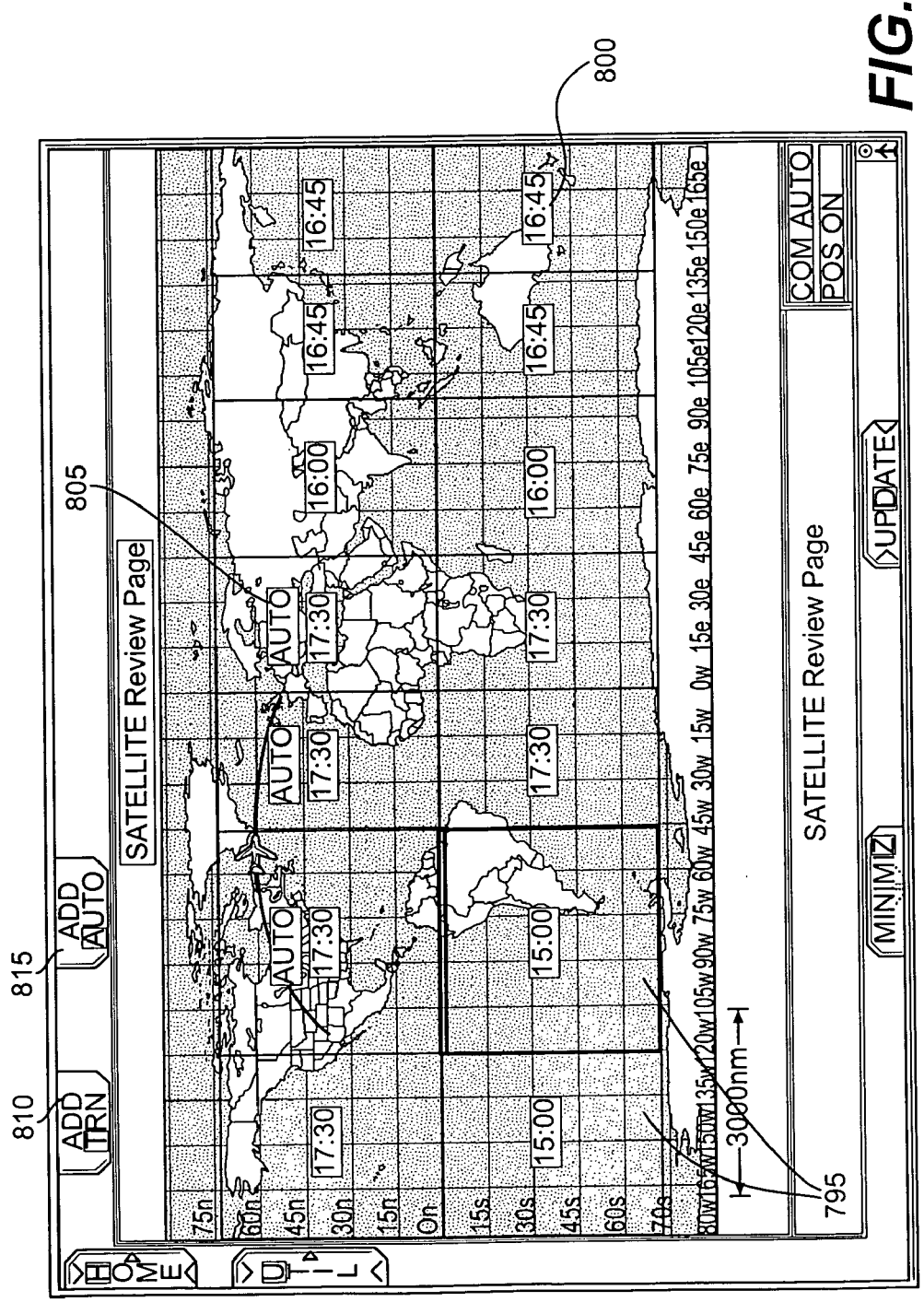
FIG. 33 is a typical screen display illustrating a preferred aspect of the update feature shown in FIG. 32.

Selecting the UPDATE option 745 allows the user to request updated information for a weather component from the data center. FIG. 32 illustrates a typical screen display that appears when the UPDATE option is selected. Selecting one of the weather components from the top menu causes the display of a map of the world, such as shown in FIG. 33. The map is divided into 14 regions or zones 795, and within each region 795 there is a time 800 indicating a valid time for the selected weather component for that region. Some of the regions shown in FIG. 33 also include the designation AUTO 805. That means that the program is automatically requesting updated information, in this case weather satellite information, for those regions. For any of the other regions, the user can manually request a one-time update by selecting an ADD TRN option 810 on the top menu. Additionally, the user can add a region to the list of those for which the program is automatically requesting updates by selecting an ADD AUTO option 815, also on the top menu. Conversely, if the program is already automatically requesting updates for a region, such automatic retrieval can be disabled by selecting a DELETE AUTO option (not shown). In this way, the user can configure the program to automatically request only those weather components that he or she desires. The user then can manually retrieve other weather components on an as-needed basis. That way, data communicated from the data center to the aircraft can be streamlined to meet the user's particularized needs, avoiding the needless transmission of extraneous data.

The LGND option 750 toggles on and off a legend for the selected weather component(s), such as, for example, the radar legend 590 shown in FIG. 12, the convection legend 600 shown in FIG. 13, the turbulence legend 610 shown in FIG. 14, the satellite legend 635 shown in FIG. 16, the icing potential legend 645 shown in FIG. 17, or the airports legend 695 shown in FIG. 20.

The HIST option 755, shown for example in FIG. 12, appears on the left menu whenever one of the weather components for which historical data is available is currently selected. Selecting the HIST option 755 runs a history of the displayed weather component in successive time increments up to the latest available data.

The utilities page, shown in FIG. 9, preferably includes the following options: NAVAID 820, FCST 825, ARC 830, WPT 835, TRKUP 840, HOME 505, AUTO COM 845, PRINT 850, EXIT 855, MINIMIZ 860, UPDATE 745, and LGND 750.

Figure 34:
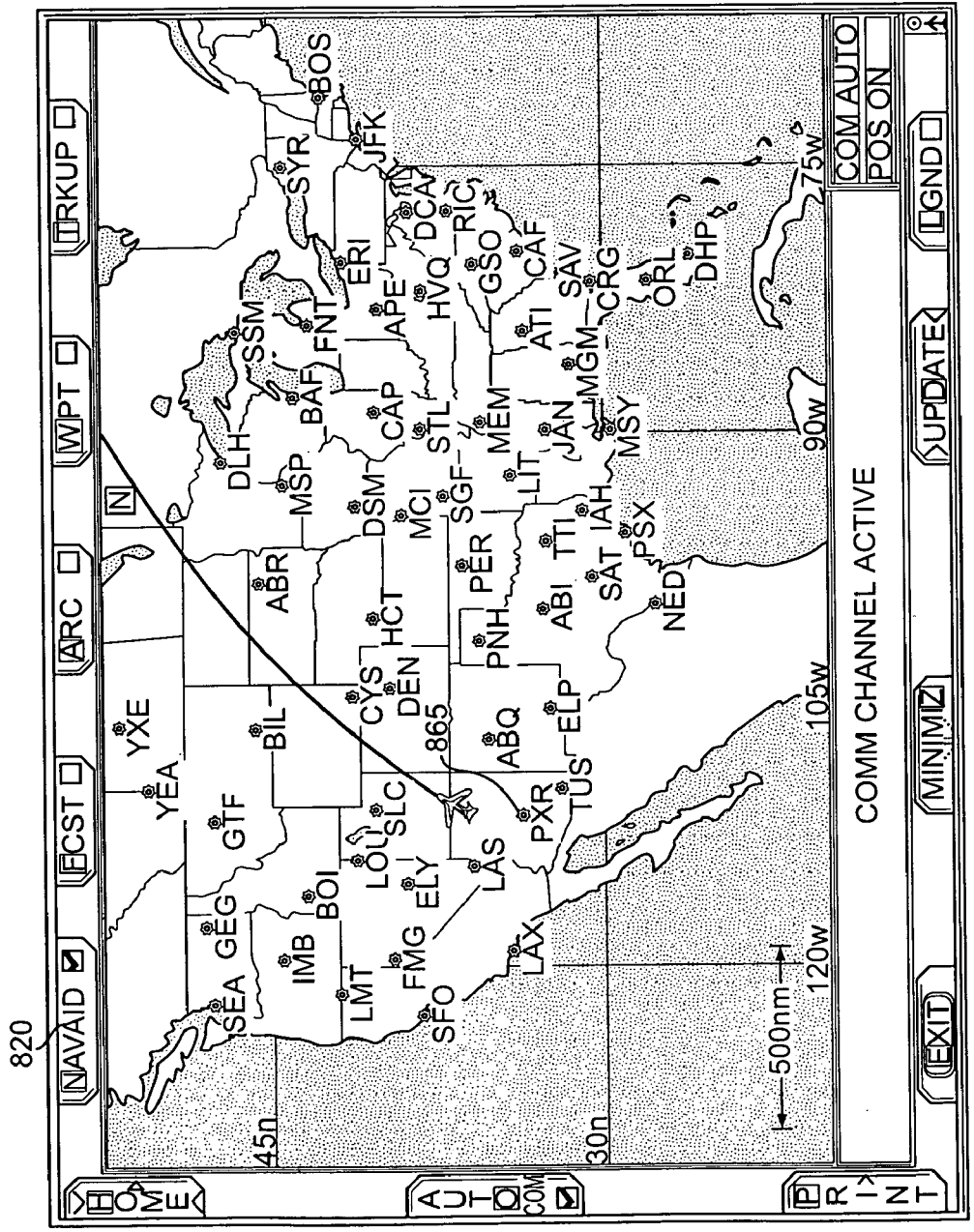
FIG. 34 is a typical screen display illustrating a preferred navigational aid feature of the present invention.

The NAVAID option 820 toggles on and off the display of navigational aids 865, such as shown in FIG. 34. Navigational aids are three letter designations for airports within the displayed region.

The FCST option 825 allows the user to view forecasts for any of the data sets for which forecast information is available. For example, FIGS. 13 and 14 show convection and turbulence forecast information, respectively, in addition to observed conditions. The legend associated with each display differentiates between actual observations and forecasts.

Figure 35:
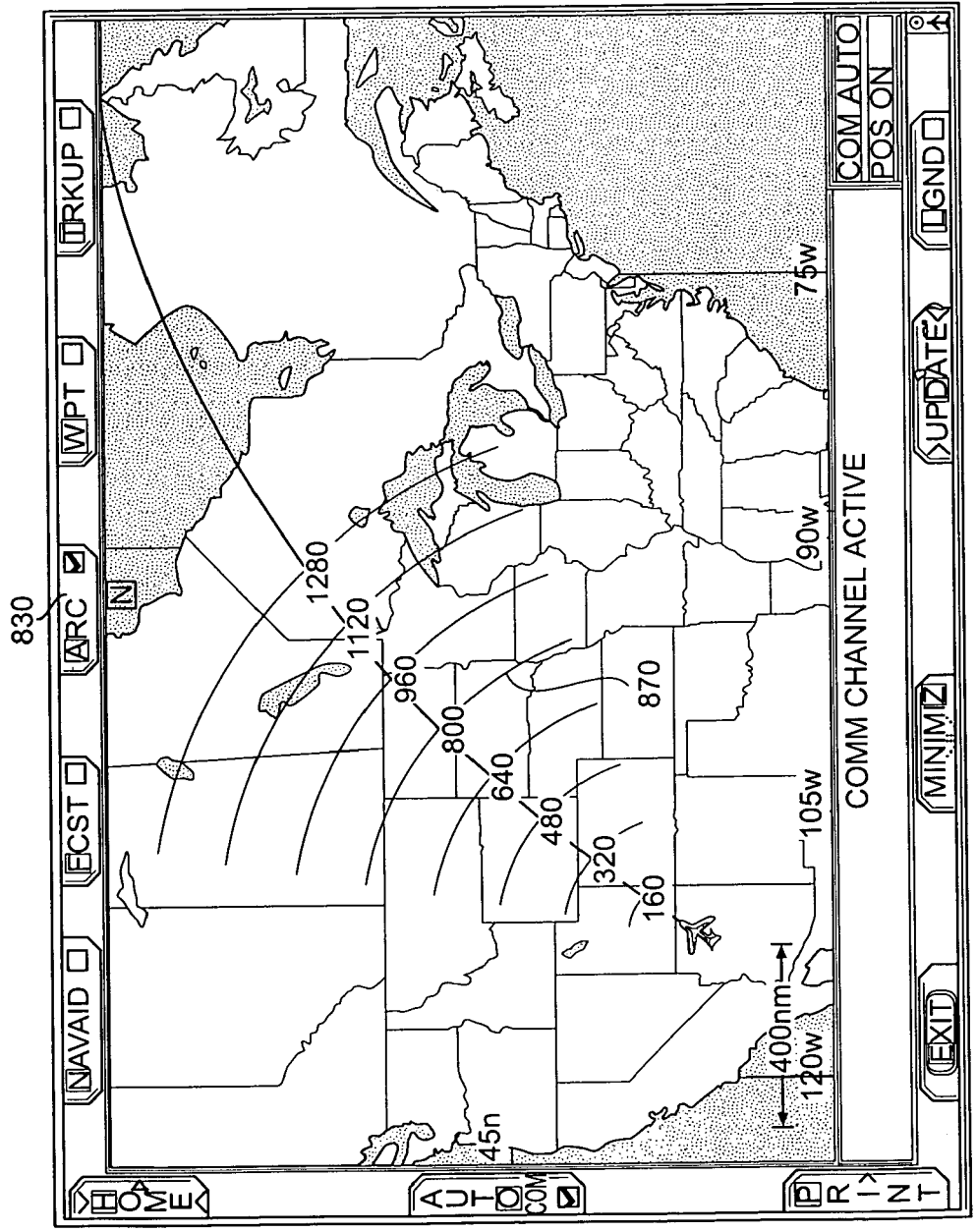
FIG. 35 is a typical screen display illustrating a preferred range arc feature of the present invention.

The ARC option 830 toggles on and off range arcs 870, such as shown in FIG. 35.

Selecting the WPT option 835 displays waypoints, if any, for the flight route.

Figure 36:
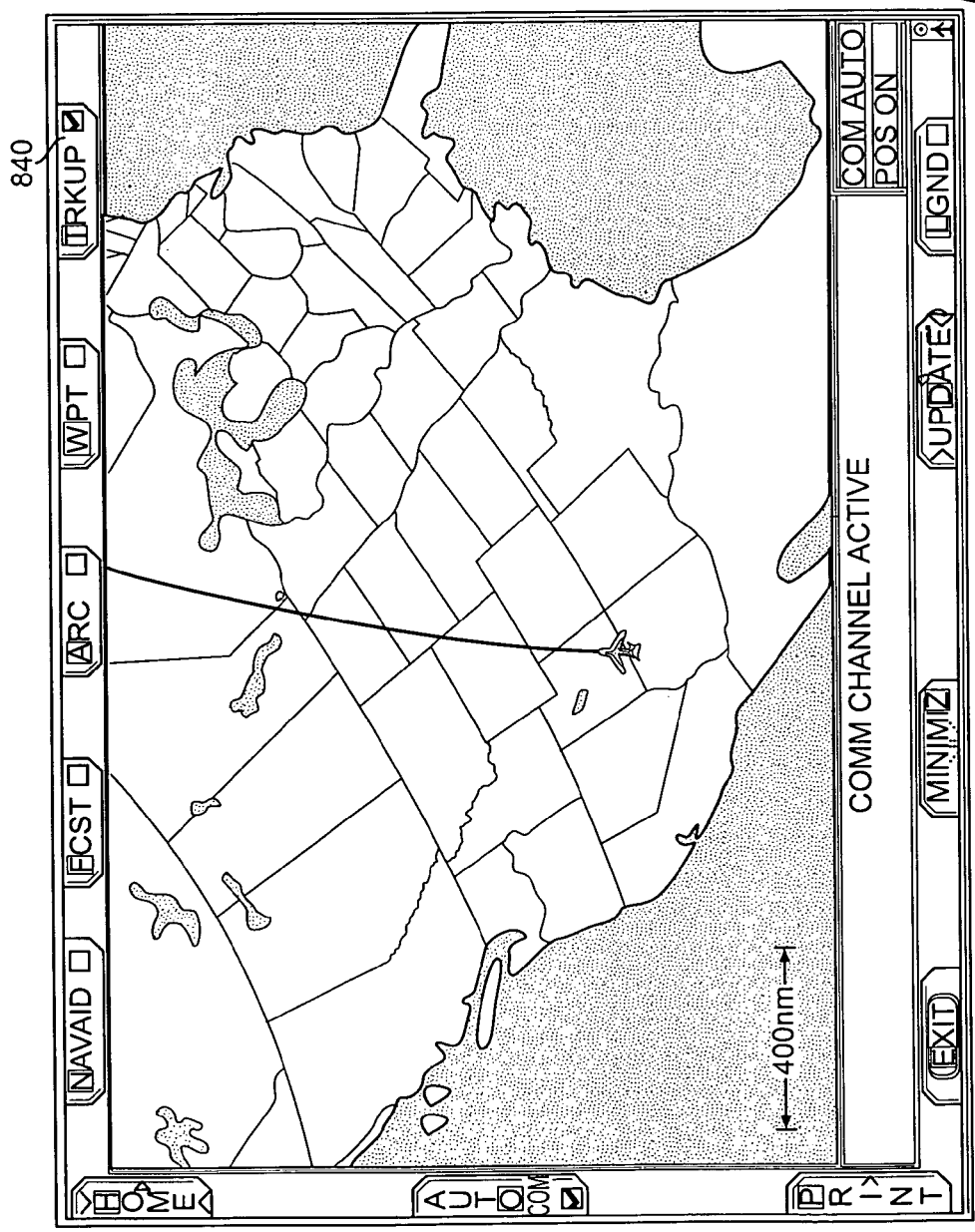
FIG. 36 is a typical screen display illustrating a track up feature of the present invention.

Selecting the TRKUP option 840 rotates the map display so that the aircraft track points upward, such as shown in FIG. 36. Normally, the map display is oriented so that the north direction points upward.

The AUTO COM option 845 allows the user to turn the automatic data request function on and off.

Selecting the PRINT option 850 sends the screen display to a printer, if available, or to an electronic file.

Selecting the EXIT option 855 closes the program.

Selecting the MINIMIZ option 860 minimizes the display, so that other programs can be run simultaneously.

Figure 37:
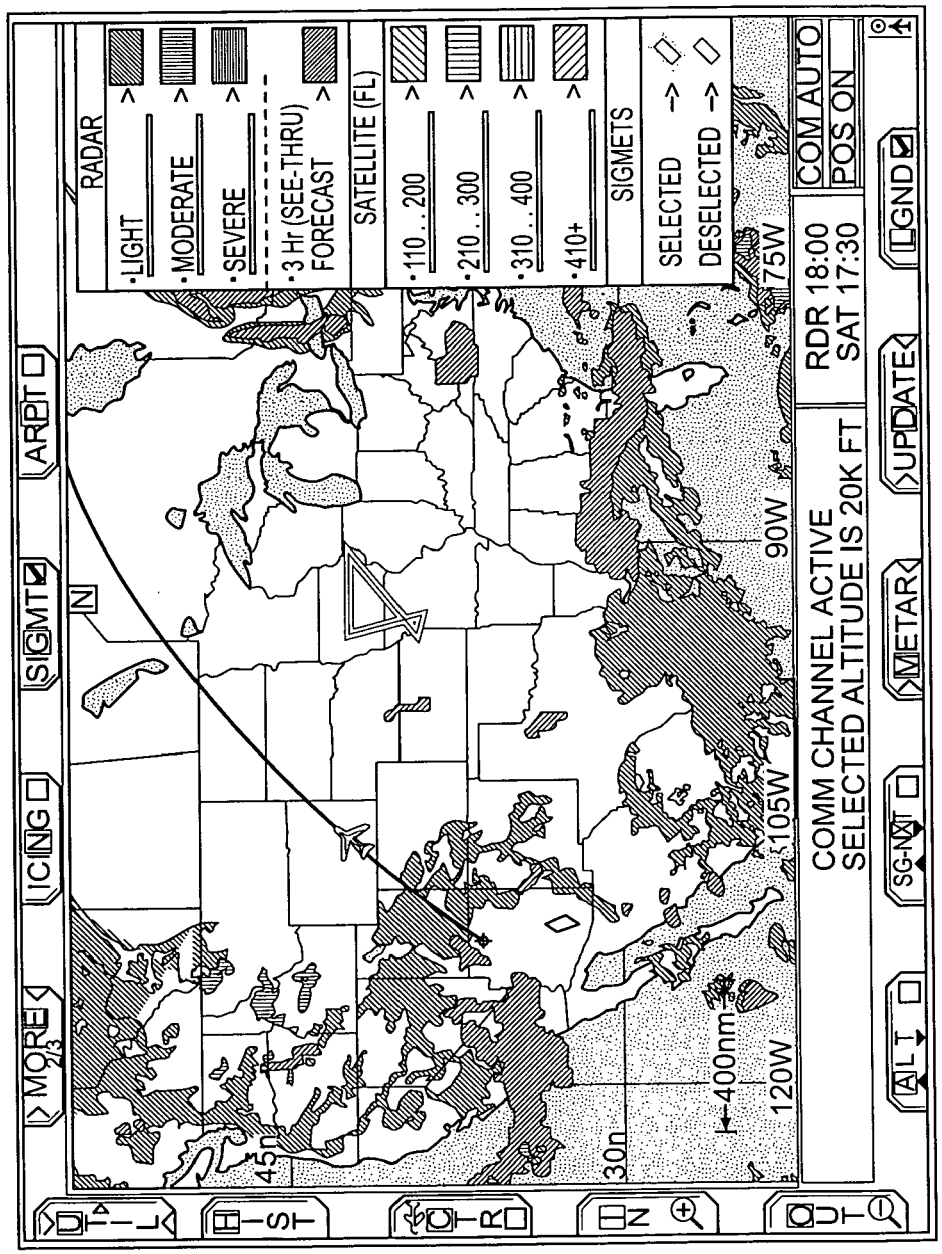
FIG. 37 is a typical screen display illustrating the layering of multiple weather components.

A particularly useful feature of the weather program of the present invention is that it allows for the display of multiple weather components simultaneously, creating a layered effect. In FIG. 37, for example, turbulence information, weather satellite information, and SIGMETs are simultaneously displayed on the map.

Figure 38:
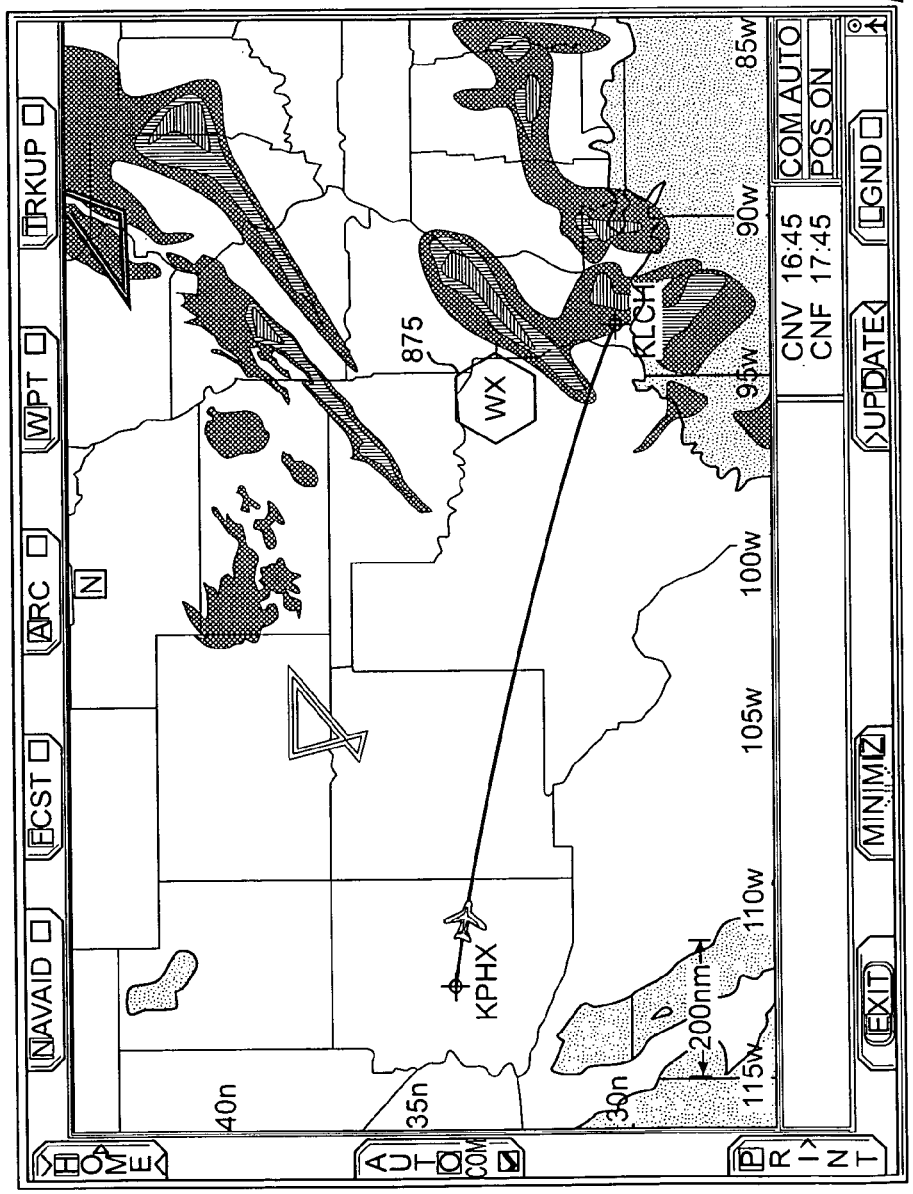
FIG. 38 is a typical screen display illustrating a conflict depiction feature of the present invention.

Another useful feature is the depiction of conflict areas between hazardous weather and the flight route. As shown in FIG. 38, a warning symbol 875 is graphically displayed wherever the flight route is intercepted by hazardous weather.

The preferred embodiments described above are representative of embodiments of the present invention and are provided for illustrative purposes only. They are not intended to limit the scope of the present invention. Although weather components, equipment, options, communication routes, etc., have been shown and described, such are not limiting. Modifications and variations are contemplated within the scope of the present invention, which is intended to be limited only by the scope of the accompanying claims.

We claim:

1. An apparatus for providing weather information onboard an aircraft, comprising:
   a processor unit which processes weather information after it is received onboard the aircraft from a ground-based source containing a plurality of types of weather information; and
   a graphical user interface which provides a graphical presentation of the weather information to a user onboard the aircraft, and which includes a user-selectable option that allows the user to request specific weather information for transmission from the ground-based source to the aircraft.

2. The apparatus of claim 1, wherein the graphical user interface further includes one or more user-selectable options for graphically displaying at least one of convection information, turbulence information, icing information, weather satellite information, SIGMET information, significant weather prognosis information, and winds aloft information.

3. The apparatus of claim 1, wherein the graphical user interface further includes a user-selectable option that allows the user to select what weather information is automatically transmitted from the ground-based source.

4. The apparatus of claim 1, wherein the graphical user interface further includes a user-selectable option for displaying the weather information in cross-sectional view along a route of the aircraft.

5. The apparatus of claim 1, wherein the graphical user interface allows the user to view multiple types of weather data simultaneously.

6. An apparatus for providing weather information onboard an aircraft, comprising:
   a processor unit which processes weather information after it is received onboard the aircraft from a ground-based source; and
   a graphical user interface which includes a user-selectable option that allows the user to request specific weather information for transmission from the ground-based source to the aircraft and provides a plan view of the weather information and position of the aircraft to a user onboard the aircraft, and which includes a user-selectable option for centering the plan view on the position of the aircraft, even as the position of the aircraft changes.

7. The apparatus of claim 6, wherein the graphical user interface further includes a user-selectable option for orienting the plan view so that the aircraft track points upward.

8. An apparatus for providing weather information onboard an aircraft, comprising:
   a processor unit which processes weather information, including three-dimensional weather information, after it is received onboard the aircraft from a ground-based source; and
   a graphical user interface which includes a user-selectable option that allows the user to request specific weather information for transmission from the ground-based source to the aircraft and provides a plan view of the weather information for a selected altitude to a user onboard the aircraft, and which includes a user-selectable option for changing the selected altitude.

* * * * *